United States Patent
Yahata et al.

(10) Patent No.: US 12,489,983 B2
(45) Date of Patent: Dec. 2, 2025

(54) IMAGING DEVICE INCLUDING HIGH SENSITIVITY PIXELS AND LOW SENSITIVITY PIXEL

(71) Applicant: SK hynix Inc., Icheon-si (KR)

(72) Inventors: Kazuhiro Yahata, Tokyo (JP); Ken Sawada, Tokyo (JP); Kunihiro Yamamoto, Tokyo (JP)

(73) Assignee: SK HYNIX INC., Icheon-si (KR)

( * ) Notice: Subject to any disclaimer, the term of this patent is extended or adjusted under 35 U.S.C. 154(b) by 480 days.

(21) Appl. No.: 17/968,975

(22) Filed: Oct. 19, 2022

(65) Prior Publication Data

US 2023/0124606 A1     Apr. 20, 2023

(30) Foreign Application Priority Data

Oct. 19, 2021  (KR) ........................ 10-2021-0139219

(51) Int. Cl.
*H04N 23/741*     (2023.01)
*G06T 3/4015*     (2024.01)
(Continued)

(52) U.S. Cl.
CPC ......... *H04N 23/741* (2023.01); *G06T 3/4015* (2013.01); *G06T 7/13* (2017.01);
(Continued)

(58) Field of Classification Search
CPC ...... H04N 23/741; H04N 25/57; H04N 23/76; H04N 25/11; H04N 25/60; G06T 3/4015;
(Continued)

(56) References Cited

U.S. PATENT DOCUMENTS 8,018,516 B2   9/2011   Hirai et al.
8,830,364 B2   9/2014   Wada
(Continued)

FOREIGN PATENT DOCUMENTS

CN   101080922 A   11/2007
CN   111464754 A   7/2020
(Continued)

OTHER PUBLICATIONS

Second Office Action mailed Jun. 5, 2025 in Chinese Patent Application No. 202211273339.X, 9 pages, English Translation.

*Primary Examiner* — Christopher K Peterson
(74) *Attorney, Agent, or Firm* — Perkins Coie LLP

(57) ABSTRACT

An imaging device includes an image sensing device and an image signal processor. The imaging sensing device includes a pixel array of sensing pixels comprising a first pixel for sensing incident light and having a first dynamic range and a second pixel for sensing incident light and having a second dynamic range, the pixel array of sensing pixels structured to have a ratio of a number of the first pixels to all sensing pixels to be higher than a ratio of a number of second pixels to all sensing pixels. The image signal processor is configured to receive and process pixel data from the image sensing device to generate a high dynamic range (HDR) image corresponding to a larger dynamic range than the first dynamic range or the second dynamic range, based on pixel data of the first pixels and pixel data of the second pixels in the pixel array.

20 Claims, 19 Drawing Sheets

(51) Int. Cl.
*G06T 7/13* (2017.01)
*G06V 10/143* (2022.01)
*G06V 10/25* (2022.01)
*G06V 10/60* (2022.01)
*G06V 10/75* (2022.01)

(52) U.S. Cl.
CPC ............ *G06V 10/143* (2022.01); *G06V 10/25* (2022.01); *G06V 10/60* (2022.01); *G06V 10/751* (2022.01); *G06T 2207/20208* (2013.01)

(58) Field of Classification Search
CPC ............. G06T 7/13; G06T 2207/20208; G06T 2207/20221; G06T 5/50; G06V 10/143; G06V 10/25; G06V 10/60; G06V 10/751
See application file for complete search history.

(56) References Cited

U.S. PATENT DOCUMENTS

| | | |
|---|---|---|
| 9,666,631 B2 | 5/2017 | Lyu et al. |
| 9,711,546 B2 | 7/2017 | Lyu et al. |
| 9,966,396 B2 | 5/2018 | Qian et al. |
| 10,187,586 B2 | 1/2019 | Choe et al. |
| 10,367,027 B2 | 7/2019 | Suzuki et al. |
| 10,411,063 B2 | 9/2019 | Yang et al. |
| 10,594,961 B2 | 3/2020 | Hirota et al. |
| 2009/0147119 A1* | 6/2009 | Kamiyama ............ H04N 23/76 348/308 |
| 2009/0268963 A1 | 10/2009 | Kang et al. |
| 2010/0013961 A1* | 1/2010 | Lee ...................... H04N 23/951 348/241 |
| 2012/0235021 A1* | 9/2012 | Kasai ................... H04N 25/583 250/208.1 |
| 2013/0093842 A1* | 4/2013 | Yahata ................... H04N 23/69 348/E7.001 |
| 2016/0118978 A1* | 4/2016 | Ahn ....................... H04N 25/76 327/543 |
| 2017/0013217 A1 | 1/2017 | Lee et al. |
| 2017/0104942 A1 | 4/2017 | Hirota et al. |
| 2017/0148831 A1* | 5/2017 | Choi ..................... H10F 39/813 |
| 2017/0201693 A1* | 7/2017 | Sugizaki ............... H04N 23/71 |
| 2018/0352199 A1* | 12/2018 | Hwang .................... H04N 9/01 |
| 2019/0096933 A1 | 3/2019 | Kido et al. |
| 2019/0182458 A1 | 6/2019 | Kawano |
| 2019/0259795 A1* | 8/2019 | Jang .................. H10F 39/8023 |
| 2019/0327439 A1* | 10/2019 | Chen ..................... H04N 25/59 |
| 2020/0169704 A1* | 5/2020 | Fujii ..................... H04N 23/12 |
| 2020/0344430 A1* | 10/2020 | Wang .................. H04N 25/571 |
| 2021/0136275 A1* | 5/2021 | Solhusvik ........... H04N 25/778 |
| 2021/0168275 A1* | 6/2021 | Zhang .................... H04N 23/71 |
| 2021/0382175 A1* | 12/2021 | Yoon .................. H04N 25/705 |
| 2023/0053038 A1* | 2/2023 | Hirasawa ............. H04N 23/843 |

FOREIGN PATENT DOCUMENTS

| | | |
|---|---|---|
| CN | 112788258 A | 5/2021 |
| JP | H10189930 A | 7/1998 |
| JP | 2007124137 A | 5/2007 |
| JP | 2013162347 A | 8/2013 |
| JP | 2018112936 A | 7/2018 |
| KR | 100813360 B1 | 3/2008 |
| KR | 101861767 B1 | 5/2018 |
| WO | 2021140873 A1 | 7/2021 |

* cited by examiner

IMAGING DEVICE INCLUDING HIGH SENSITIVITY PIXELS AND LOW SENSITIVITY PIXEL

CROSS-REFERENCE TO RELATED APPLICATION

This patent document claims the priority and benefits of Korean patent application No. 10-2021-0139219, filed on Oct. 19, 2021, the disclosure of which is incorporated herein by reference in its entirety as part of the disclosure of this patent document.

TECHNICAL FIELD

The technology and implementations disclosed in this patent document generally relate to an imaging device capable of generating image data by sensing light.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various fields such as smart phones, digital cameras, game machines, IoT (Internet of Things), robots, security cameras and medical micro cameras.

The image sensing device may be roughly divided into CCD (Charge Coupled Device) image sensing devices and CMOS (Complementary Metal Oxide Semiconductor) image sensing devices. The CCD image sensing devices offer a better image quality, but they tend to consume more power and are larger as compared to the CMOS image sensing devices. The CMOS image sensing devices are smaller in size and consume less power than the CCD image sensing devices. Furthermore, CMOS sensors are fabricated using the CMOS fabrication technology, and thus photosensitive elements and other signal processing circuitry can be integrated into a single chip, enabling the production of miniaturized image sensing devices at a lower cost. For these reasons, CMOS image sensing devices are being developed for many applications including mobile devices.

SUMMARY

Various embodiments of the disclosed technology relate to an imaging device capable of obtaining a high dynamic range (HDR) image.

In accordance with an embodiment of the disclosed technology, an imaging device may include an image sensing device and an image signal processor. The image sensing device includes at least one first pixel having a first dynamic range and at least one second pixel having a second dynamic range. The image signal processor generates a high dynamic range (HDR) image corresponding to a larger dynamic range than the first dynamic range or the second dynamic range, based on pixel data of the at least one first pixel and pixel data of the at least one second pixel. An upper limit value of the first dynamic range is lower than an upper limit value of the second dynamic range. With respect to all pixels included in the image sensing device, a ratio of the at least one first pixel is higher than a ratio of the at least one second pixel.

In another aspect, an imaging device is provided to comprise an image sensing device and an image signal processor. The image sensing device includes a pixel array of sensing pixels comprising at least one first pixel for sensing incident light and having a first dynamic range represented by a first measurable high light intensity without saturating the first pixel and a first measurable low light intensity relative to a pixel noise level of the first pixel and at least one second pixel for sensing incident light and having a second dynamic range represented by a second measurable high light intensity without saturating the second pixel that is higher than the first measurable high light intensity of the first pixel and a second measurable low light intensity relative to a pixel noise level of the second pixel, wherein the pixel array of sensing pixels is structured to have a ratio of a number of the first pixels to all sensing pixels to be higher than a ratio of a number of second pixels to all sensing pixels. The image signal processor is configured to receive and process pixel data from the image sensing device to generate a high dynamic range (HDR) image corresponding to a larger dynamic range than the first dynamic range or the second dynamic range, based on pixel data of the first pixels and pixel data of the second pixels in the pixel array.

In accordance with another embodiment of the disclosed technology, an imaging device may include an image sensing device and an image signal processor. The image sensing device includes at least one first pixel and at least one second pixel having a lower sensitivity than the at least one first pixel. The image signal processor generates a high dynamic range (HDR) image corresponding to a dynamic range that is greater than a dynamic range of the at least one first pixel or a dynamic range of the at least one second pixel, based on pixel data of the at least one first pixel and pixel data of the at least one second pixel. A ratio of the at least one first pixel to all pixels included in the image sensing device is higher than a ratio of the at least one second pixel to all pixels included in the image sensing device.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
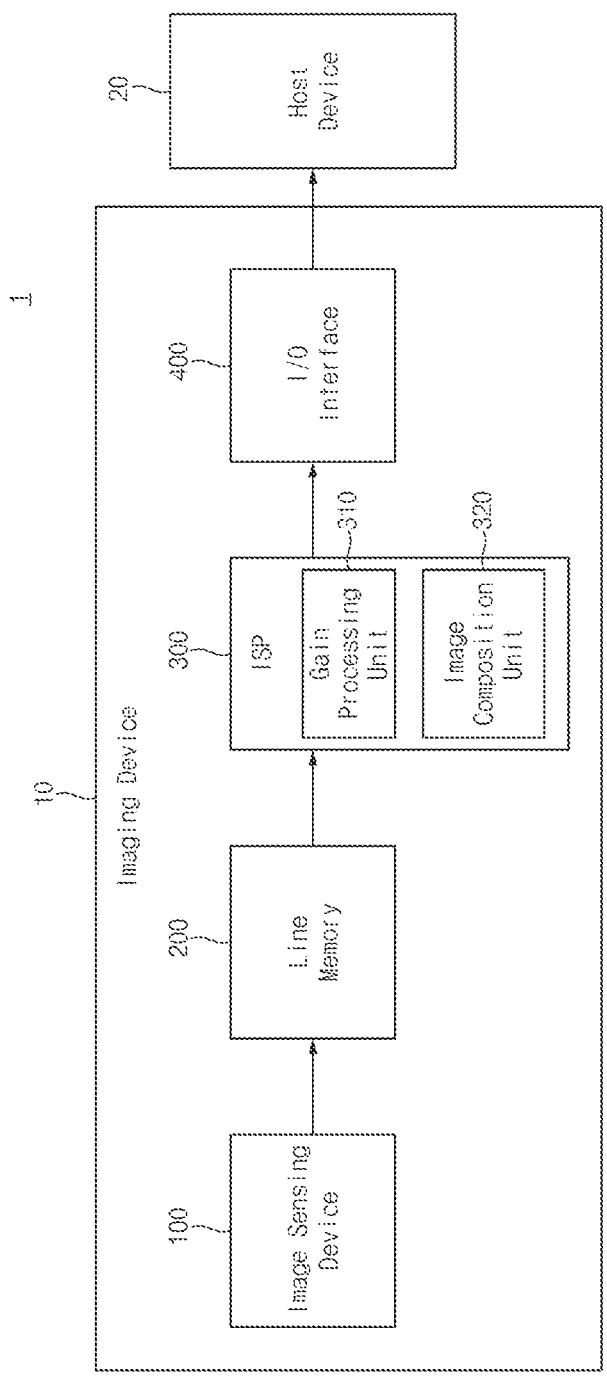
FIG. 1 is a block diagram illustrating an example of an imaging system based on some implementations of the disclosed technology.

This patent document provides implementations and examples of an imaging device capable of generating image data by sensing light, that may be used in configurations to substantially address one or more technical or engineering issues and to mitigate limitations or disadvantages encountered in some other image sensing devices. Some implementations of the disclosed technology relate to an imaging device capable of obtaining a high dynamic range (HDR) image. The disclosed technology provides various implementations of an image sensing device that is configured such that a high-sensitivity pixel and a low-sensitivity pixel that are arranged together, thereby obtaining a high dynamic range (HDR) image by performing image capture only once (i.e., one photographing action).

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Figure 2:
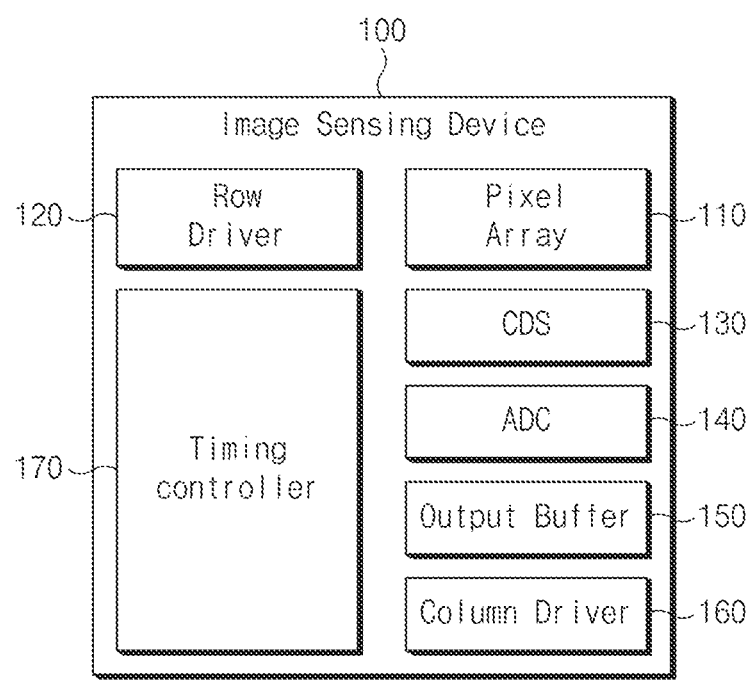
FIG. 2 is a block diagram illustrating an example of an image sensing device shown in FIG. 1 based on some implementations of the disclosed technology.
Figure 3:
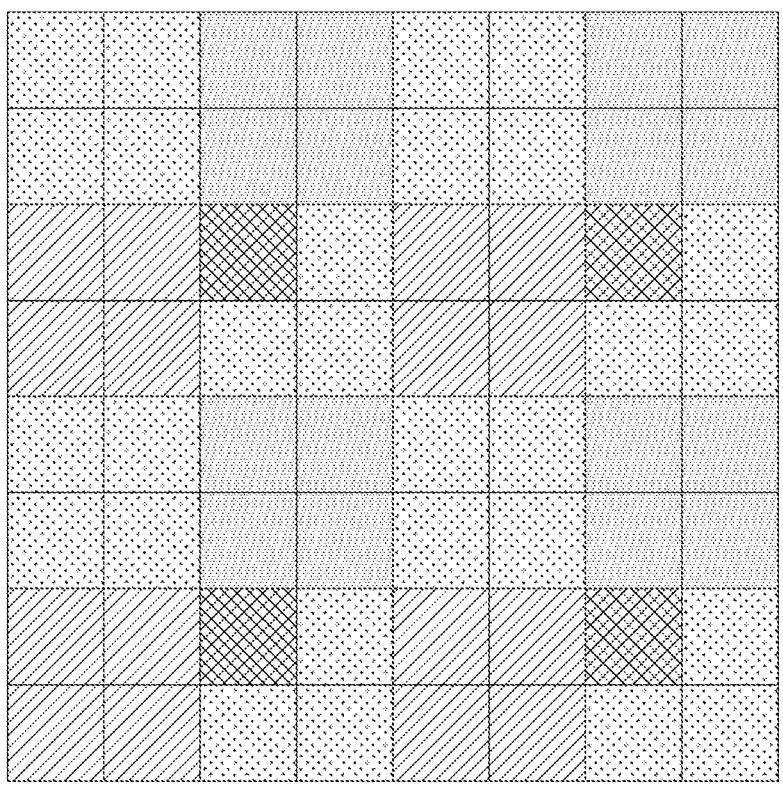
FIG. 3 is a schematic diagram illustrating an example of a pixel array shown in FIG. 1 based on some implementations of the disclosed technology.
Figure 4:
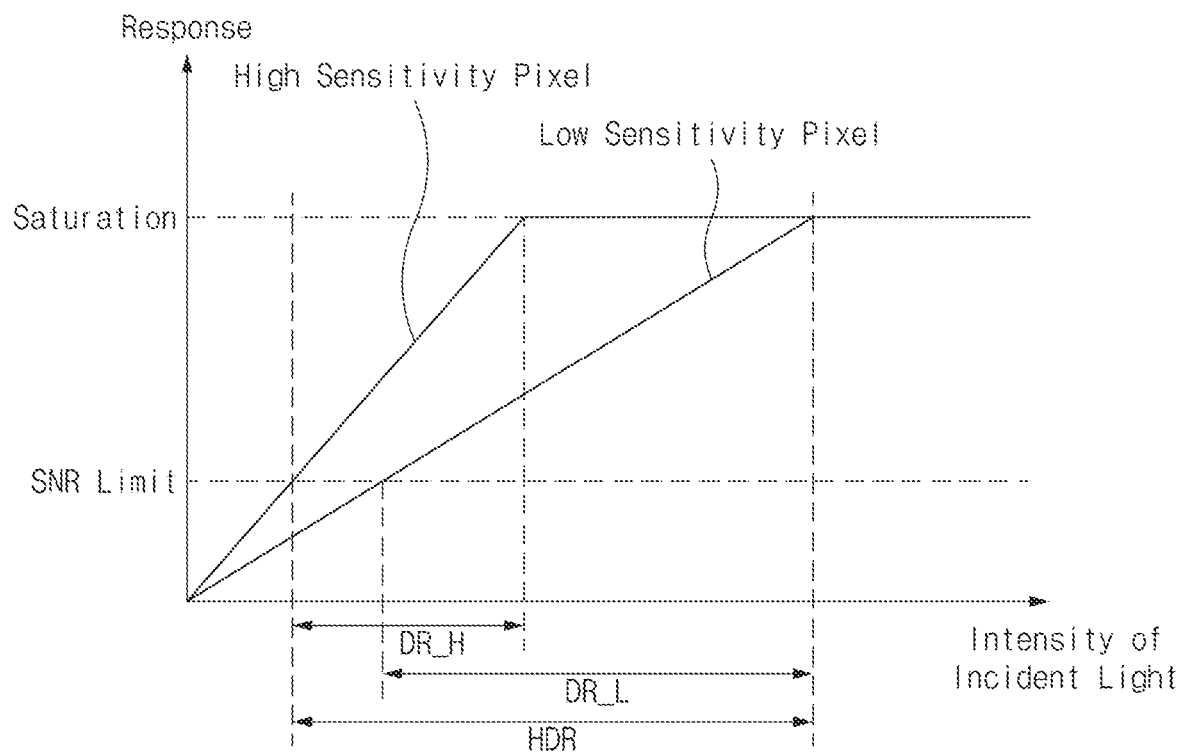
FIG. 4 is a graph illustrating an example of responses depending on the intensity of incident light applied to a high-sensitivity pixel and a low-sensitivity pixel based on some implementations of the disclosed technology.

FIG. 1 is a block diagram illustrating an example of an imaging system 1 based on some implementations of the disclosed technology. FIG. 2 is a block diagram illustrating an example of an image sensing device shown in FIG. 1. FIG. 3 is a schematic diagram illustrating an example of a pixel array shown in FIG. 1. FIG. 4 is a graph illustrating an example of responses depending on the intensity of incident light applied to a high-sensitivity pixel and a low-sensitivity pixel.

Referring to FIG. 1, the imaging system 1 may refer to a device, for example, a digital still camera for photographing still images or a digital video camera for photographing moving images. For example, the imaging device 10 may be implemented as a Digital Single Lens Reflex (DSLR) camera, a mirrorless camera, or a smartphone, and others. The imaging device 10 may include a device having both a lens and an image pickup element such that the device can capture (or photograph) a target object and can thus create an image of the target object.

The imaging system 1 may include an imaging device 10 and a host device 20.

The imaging device 10 may include an image sensing device 100, a line memory 200, an image signal processor (ISP) 300, and an input/output (I/O) interface 400.

The image sensing device 100 may be a complementary metal oxide semiconductor image sensor (CIS) for converting an optical signal into an electrical signal. The image sensing device 100 may control overall operations such as on/off, operation mode, operation timing, sensitivity, etc. by the ISP 300. The image sensing device 100 may provide the line memory 200 with image data obtained by converting the optical signal into the electrical signal under control of the ITSP 300.

Referring to FIG. 2, the image sensing device 100 may include a pixel array 110, a row driver 120, a correlated double sampler (CDS) 130, an analog-digital converter (ADC) 140, an output buffer 150, a column driver 160, and a timing controller 170. The components of the image sensing device 100 illustrated in FIG. 2 are discussed by way of example only, and this patent document encompasses numerous other changes, substitutions, variations, alterations, and modifications.

The pixel array 110 may include a plurality of imaging pixels arranged in rows and columns. In one example, the plurality of imaging pixels can be arranged in a two dimensional pixel array including rows and columns. In another example, the plurality of imaging pixels can be arranged in a three dimensional pixel array. The plurality of imaging pixels may convert an optical signal into an electrical signal on a unit pixel basis or a pixel group basis, where the imaging pixels in a pixel group share at least certain internal circuitry. The pixel array 110 may receive pixel control signals, including a row selection signal, a pixel reset signal and a transmission signal, from the row driver 120. Upon receiving the pixel control signals, corresponding imaging pixels in the pixel array 110 may be activated to perform the operations corresponding to the row selection signal, the pixel reset signal, and the transmission signal. Each of the imaging pixels may generate photocharges corresponding to the intensity of incident light, may generate an electrical signal corresponding to the amount of photocharges, thereby sensing the incident light. For convenience of description, the imaging pixel may also be referred to as a pixel.

The row driver 120 may activate the pixel array 110 to perform certain operations on the imaging pixels in the corresponding row based on commands and control signals provided by controller circuitry such as the timing controller 170. In some implementations, the row driver 120 may select one or more imaging pixels arranged in one or more rows of the pixel array 110. The row driver 120 may generate a row selection signal to select one or more rows among the plurality of rows. The row decoder 120 may sequentially enable the pixel reset signal for resetting imaging pixels corresponding to at least one selected row, and the transmission signal for the pixels corresponding to the at least one selected row. Thus, a reference signal and an image signal, which are analog signals generated by each of the imaging pixels of the selected row, may be sequentially transferred to the CDS 130. The reference signal may be an electrical signal that is provided to the CDS 130 when a sensing node of an imaging pixel (e.g., floating diffusion node) is reset, and the image signal may be an electrical signal that is provided to the CDS 130 when photocharges generated by the imaging pixel are accumulated in the sensing node. The reference signal indicating unique reset noise of each pixel and the image signal indicating the intensity of incident light may be generically called a pixel signal as necessary.

The image sensing device 100 may use the correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after photocharges generated by incident light are accumulated in the sensing node so that only pixel output voltages based on the incident light can be measured. In some embodiments of the disclosed technology, the CDS 130 may sequentially sample and hold voltage levels of the reference signal and the image signal, which are provided to each of a plurality of column lines from the pixel array 110. That is, the CDS 130 may sample and hold the voltage levels of the reference signal and the image signal which correspond to each of the columns of the pixel array 110.

In some implementations, the CDS 130 may transfer the reference signal and the image signal of each of the columns as a correlate double sampling signal to the ADC 140 based on control signals from the timing controller 170.

The ADC 140 is used to convert analog CDS signals into digital signals. In some implementations, the ADC 140 may be implemented as a ramp-compare type ADC. In some embodiments of the disclosed technology, the ADC 140 may convert the correlate double sampling signal generated by the CDS 130 for each of the columns into a digital signal, and output the digital signal.

The ADC 140 may include a plurality of column counters. Each column of the pixel array 110 is coupled to a column counter, and image data can be generated by converting the correlate double sampling signals received from each column into digital signals using the column counter. In another embodiment of the disclosed technology, the ADC 140 may include a global counter to convert the correlate double sampling signals corresponding to the columns into digital signals using a global code provided from the global counter.

The output buffer 150 may temporarily hold the column-based image data provided from the ADC 140 to output the image data. In one example, the image data provided to the output buffer 150 from the ADC 140 may be temporarily stored in the output buffer 150 based on control signals of the timing controller 170. The output buffer 150 may provide an interface to compensate for data rate differences or transmission rate differences between the image sensing device 100 and other devices.

The column driver 160 may select a column of the output buffer upon receiving a control signal from the timing controller 170, and sequentially output the image data, which are temporarily stored in the selected column of the output buffer 150. In some implementations, upon receiving an address signal from the timing controller 170, the column driver 160 may generate a column selection signal based on the address signal and select a column of the output buffer 150, outputting the image data as an output signal from the selected column of the output buffer 150.

The timing controller 170 may control operations of the row driver 120, the ADC 140, the output buffer 150 and the column driver 160.

The timing controller 170 may provide the row driver 120, the column driver 160 and the output buffer 150 with a clock signal required for the operations of the respective components of the image sensing device 100, a control signal for timing control, and address signals for selecting a row or column. In an embodiment of the disclosed technology, the timing controller 170 may include a logic control circuit, a phase lock loop (PLL) circuit, a timing control circuit, a communication interface circuit and others.

FIG. 3 is a diagram illustrating one example of an arrangement of pixels included in the pixel array 110. FIG. 3 is a diagram illustrating 64 pixels arranged in a matrix array including 8 rows and 8 columns. For example, 64 pixels may be used as a minimum unit, and may be repeated in row and column directions, without being limited thereto.

The pixel array 110 may include red pixels, blue pixels, and green pixels. Each of the red pixels may include a red color filter configured to selectively transmit light (i.e., red light) corresponding to a red color, and may sense the red light. Each of the blue pixels may include a blue color filter configured to selectively transmit light (i.e., blue light) corresponding to a blue color, and may sense the blue light. Each of the green pixels may include a green color filter configured to selectively transmit light (i.e., green light) corresponding to a green color, and may sense the green light.

In some implementations, the red pixels, the blue pixels, and the green pixels may be arranged in a quad Bayer pattern. The quad Bayer pattern may refer to a pattern in which a red pixel group, a blue pixel group, and a green pixel group are arranged in a Bayer pattern. In the red pixel group, the red pixels are arranged in a (2×2) matrix. In the blue pixel group, the blue pixels are arranged in a (2×2) matrix. In the green pixel group, the green pixels are arranged in a (2×2) matrix. Accordingly, in the quad Bayer pattern, the red pixel group and the blue pixel group may be arranged in a diagonal direction. In the quad Bayer pattern, the green pixel group may be disposed to contact one side of each of the red pixel group and the blue pixel group, such that all pixels may be arranged in a (4×4) matrix.

The pixels included in the pixel array 110 can be classified according to different colors of light to be sensed by the respective pixels. In some implementations, the pixels included in the pixel array 110 can be also classified into a high-sensitivity pixel and a low-sensitivity pixel according to sensitivity of incident light. A pixel having a relatively high sensitivity may be defined as a high-sensitivity pixel, and a pixel having a relatively low sensitivity may be defined as a low-sensitivity pixel. The high-sensitivity pixel and the low-sensitivity pixel will be described later in detail with reference to FIG. 4.

The pixels in the pixel array structured as the red pixels, blue pixels, and green pixels can be formed by using either a pixel having a relatively high sensitivity or a pixel having a relatively low sensitivity. For example, a pixel having a relatively high sensitivity among red pixels may be defined as a high-sensitivity red pixel, and a pixel having a relatively low sensitivity among red pixels may be defined as a low-sensitivity red pixel. Similarly, a pixel having a relatively high sensitivity among blue pixels may be defined as a high-sensitivity blue pixel, and a pixel having a relatively low sensitivity among blue pixels may be defined as a low-sensitivity blue pixel. In addition, a pixel having a relatively high sensitivity among green pixels may be defined as a high-sensitivity green pixel, and a pixel having a relatively low sensitivity among green pixels may be defined as a low-sensitivity green pixel.

In FIG. 3, 16 red pixels among 64 pixels included in the pixel array may be high-sensitivity red pixels (RP_H), and 16 blue pixels among 64 pixels included in the pixel array may be high-sensitivity blue pixels (BP_H). However, 32 green pixels among 64 pixels included in the pixel array may include 28 high-sensitivity green pixels (GP_H) and four low-sensitivity green pixels (GP_L).

Thus, a total of 64 pixels may include four low-sensitivity pixels and 60 high-sensitivity pixels, and the ratio of low-sensitivity pixels to all pixels (i.e., 64 pixels) may be set to 4/64 (=1/16) that is less than the ratio of high-sensitivity pixels to all pixels (i.e., 64 pixels).

The ratio of low-sensitivity pixels to all pixels (i.e., 64 pixels) is not limited to the example of FIG. 3, and may be experimentally determined so that sufficient HDR performance can appear at a level that does not deteriorate the final image resolution of images captured by high-sensitivity pixels.

Although the example of FIG. 3 illustrates that the low-sensitivity pixels are green pixels as the example, other implementations are possible without being limited thereto. In some implementations, the low-sensitivity pixels may also be red pixels or blue pixels.

FIG. 4 shows that responses of the high-sensitivity pixel and the low-sensitivity pixel change depending on the intensity of incident light applied to the corresponding pixel. Referring to FIG. 4, a high-sensitivity pixel has a relatively larger amount of increase in response according to an increase in the intensity of incident light and a low-sensitivity pixel has a relatively smaller amount of increase in response according to an increase in the intensity of incident light. Here, the response of a pixel may refer to image data (i.e., pixel data) of the corresponding pixel. In this case, the intensity of incident light may refer to brightness or illuminance of a target object to be sensed by the corresponding pixel. In some implementations, the high-sensitivity pixel may also be referred to as a first pixel, and the low-sensitivity pixel may also be referred to as a second pixel.

The response may have a signal-to-noise ratio (SNR) limit (denoted by SNR limit) and a saturation level (denoted by Saturation).

In FIG. 4, two different responses are shown, one of which is a signal-to-noise ratio (SNR) threshold level (denoted by "SNR Limit") and the other of which is a saturation level (denoted by "Saturation"). The signal-to-noise ratio (SNR) threshold level refers to a threshold value that can satisfy a reference SNR that is predetermined. A response less than the SNR threshold level may be treated as an invalid response not satisfying the reference SNR, and a response greater than the SNR threshold level may be treated as a valid response satisfying the reference SNR. The reference SNR may be determined experimentally in consideration of characteristics of the image sensing device 100. However, for convenience of description, it is assumed that the SNR threshold level (SNR limit) is ignored in the examples shown in the drawings after FIG. 5A.

A saturation level refers to a maximum level that indicates the intensity of incident light. The saturation level may be determined by the capability (e.g., capacitance of a photoelectric conversion element) by which the pixel can convert the intensity of incident light into photocharges, the capability (e.g., capacitance of a floating diffusion (FD) region) by which photocharges can be converted into analog signals, and the capability (e.g., an input range of the ADC) by which analog signals can be converted into digital signals. As the intensity of incident light increases, the response may increase in proportion to the intensity of incident light until the response reaches the saturation level. After the response reaches the saturation level, the response may not increase although the intensity of incident light increases. For example, after the response reaches the saturation level, the response may have the same value as the saturation value and not increase above the saturation level.

The valid response of each pixel may refer to a response that can indicate the intensity of incident light while exhibiting a sufficient reference SNR. The range of the intensity of incident light corresponding to the valid response of a pixel may be referred to as a dynamic range of the pixel and includes a measurable high intensity of the incident light without saturating the pixel and a measurable low intensity of the incident light above the pixel noise level. Thus, the dynamic range of the pixel may refer to the incident-light intensity range in which each pixel has a valid response between the above measurable high and low light intensities. In some circumstances, the dynamic range of the pixel may be represented by a ratio of the measurable high intensity and the measurable low intensity or the noise intensity of the pixel.

The high-sensitivity pixel provides the response having a relatively large increase in response to an increase in the intensity of incident light. Thus, the response of the high-sensitivity pixel may have a relatively greater slope in response to the increase of the intensity of incident light until the response reaches the saturation level and have a fixed level corresponding to the saturation level regardless of the increase in the intensity of incident light after the response reaches the saturation level.

The low-sensitivity pixel provides the response having a relatively small increase in response to an increase in the intensity of incident light. Thus, the response of the low-sensitivity pixel may increase with a relatively smaller slope in response to the increase of the intensity of incident light until the response reaches the saturation level, and have a fixed level corresponding to the saturation level regardless of the increase in the intensity of incident light after the response reaches the saturation level.

As illustrated in FIG. 4, a minimum value (or first measurable low light intensity) of a high-sensitivity pixel dynamic range (DR_H) (or a first dynamic range) may be less than the minimum value (or second measurable low light intensity) of a low-sensitivity pixel dynamic range (DR_L) (or a second dynamic range), and a maximum value (or first measurable high light intensity) of the high-sensitivity pixel dynamic range (DR_H) may be less than the maximum value (or second measurable high light intensity) of the low-sensitivity pixel dynamic range (DR_L). Therefore, in a low-luminance range in which the intensity of incident light is relatively small, the high-sensitivity pixel may be more suitably used to sense the intensity of incident light. In a high-luminance range in which the intensity of incident light is relatively large, the low-sensitivity pixel may be more suitably used to sense the intensity of incident light.

High dynamic range (HDR) can be implemented using both a response of the high-sensitivity pixel suitable for the low-luminance range and a response of the low-sensitivity pixel suitable for the high-luminance range. As compared to the case in which only one of the high-sensitivity pixel and the low-sensitivity pixel is used, the above-mentioned case in which both the high-sensitivity pixel and the low-sensitivity pixel are used to implement the HDR can allow the overall pixel array to have a high dynamic range (HDR) corresponding to a specific range from the minimum value of the high-sensitivity pixel dynamic range to the maximum value of the low-sensitivity pixel dynamic range. To this end, at least a portion of the high-sensitivity pixel dynamic range and at least a portion of the low-sensitivity pixel dynamic range may overlap each other.

In order to implement a high-sensitivity pixel and a low-sensitivity pixel, a method for changing an exposure time can be used. The exposure time may refer to a time taken to generate photocharges in response to the intensity of incident light. A pixel having a relatively long exposure time may correspond to a high-sensitivity pixel, and a pixel having a relatively short exposure time may correspond to a low-sensitivity pixel.

When a high-sensitivity pixel and a low-sensitivity pixel are implemented by varying the exposure time, the high-sensitivity pixel and the low-sensitivity pixel may sense a scene at different time points, so that motion artifacts or motion blur may occur due to movement of a target object rapidly moving from one place to another place.

In some implementations, the high-sensitivity pixel and the low-sensitivity pixel are simultaneously arranged in the pixel array 110 to sense a scene at the same time point. The ISP 300 may synthesize the HDR image using both image data of the high-sensitivity pixel and image data of the low-sensitivity pixel, thereby preventing occurrence of motion artifacts or motion blur. In this case, the HDR image may refer to an image corresponding to a dynamic range greater than either a first dynamic range of the high-sensitivity pixel or a second dynamic range of the low-sensitivity pixel.

In addition, a relatively small number of low-sensitivity pixels are included in the pixel array 110, which results in a relatively low ratio of the low-sensitivity pixels. Thus, the relatively smaller number of low-sensitivity pixels may be included in the pixel array 110. Since the image sensed by high-sensitivity pixels and the image sensed by low-sensitivity pixels have different properties, it is more advantageous in terms of image quality that most images be sensed by high-sensitivity pixels and a minimum ratio of low-sensitivity pixels required for the HDR function be included in the pixel array 110.

Referring back to FIG. 1, the line memory 200 may include a volatile memory (e.g., DRAM, SRAM, etc.) and/or a non-volatile memory (e.g., a flash memory). The line memory 200 may have a capacity capable of storing image data corresponding to a predetermined number of lines. In this case, the line may refer to a row of the pixel array 110, and the predetermined number of lines may be less than a total number of rows of the pixel array 120. Therefore, the line memory 200 may be a line memory capable of storing image data corresponding to some rows (or some lines) of the pixel array 110, rather than a frame memory capable of storing image data corresponding to a frame captured by the pixel array 110. In some implementations, the line memory 200 may also be replaced with a frame memory as needed.

The line memory 200 may receive image data from the image sensing device 100, may store the received image data, and may transmit the stored image data to the ISP 400 based on the control of the ISP 300.

The ISP 300 may perform image processing of the image data stored in the line memory 200. The ISP 300 may reduce noise of image data, and may perform various kinds of image signal processing (e.g., gamma correction, color filter array interpolation, color matrix, color correction, color enhancement, lens distortion correction, etc.) for image-quality improvement of the image data. In addition, the ISP 300 may compress image data that has been created by execution of image signal processing for image-quality improvement, such that the ISP 300 can create an image file using the compressed image data. Alternatively, the ISP 300 may recover image data from the image file. In this case, the scheme for compressing such image data may be a reversible format or an irreversible format. As a representative example of such compression format, in the case of using a still image, Joint Photographic Experts Group (JPEG) format, JPEG 2000 format, or the like can be used. In addition, in the case of using moving images, a plurality of frames can be compressed according to Moving Picture Experts Group (MPEG) standards such that moving image files can be created. For example, the image files may be created according to Exchangeable image file format (Exif) standards.

In order to generate the HDR image, the ISP 300 may include a gain processing unit 310, and an image composition unit 320.

The gain processing unit 310 may determine a gain to be calculated with (to be multiplied by) pixel data of the high-sensitivity pixel and/or pixel data of the low-sensitivity pixel. The gain processing unit 310 may determine a gain according to a difference in sensitivity between the high-sensitivity pixel and the low-sensitivity pixel and other conditions, and may provide the determined gain to the image composition unit 320. The gain may be experimentally determined in advance according to the sensitivity difference and other conditions, and may be stored in the gain processing unit 310. In some implementations, the gain processing unit 310 may store the experimentally determined gain in a table, such that the gain processing unit 310 may acquire a necessary gain by referring to content stored in the table.

The image composition unit 320 may synthesize the HDR image corresponding to a high dynamic range using pixel data of the high-sensitivity pixel and/or pixel data of the low-sensitivity pixel.

In some embodiments of the disclosed technology, the image composition unit 320 may perform interpolation and calculation between pixel data of the high-sensitivity pixel and pixel data of the low-sensitivity pixel according to whether the pixel data of the high-sensitivity pixel is saturated, thereby forming the HDR image. In this case, the interpolation may refer to a process of generating pixel data of the corresponding pixel using pixel data of at least one pixel adjacent to the corresponding pixel.

For example, when pixel data of the high-sensitivity pixel is not saturated, the image composition unit 320 may determine pixel data of the high-sensitivity pixel to be HDR image data for the high-sensitivity pixel without change. In addition, the image composition unit 320 may determine a value, which is obtained by interpolation of the pixel data of the high-sensitivity pixel with respect to a low-sensitivity pixel corresponding to the high-sensitivity pixel, to be HDR image data.

When pixel data of the high-sensitivity pixel is saturated, the image composition unit 320 may determine a value, which is obtained by interpolation of the pixel data of the low-sensitivity pixel corresponding to the high-sensitivity pixel, to be HDR image data for the high-sensitivity pixel, and may determine pixel data of the low-sensitivity pixel corresponding to the high-sensitivity pixel to be HDR image data without change. In this case, during interpolation of the pixel data of the low-sensitivity pixel, a gain (e.g., 16) according to a difference in sensitivity (e.g., 16 times) between the high-sensitivity pixel and the low-sensitivity pixel may be calculated with (e.g., may be multiplied by) pixel data of the low-sensitivity pixel.

In another embodiment, when at least one high-brightness region exists in one scene, the image composition unit 320 may generate an HDR image by adjusting a composite weight between pixel data of the high-sensitivity pixel and pixel data of the low-sensitivity pixel for a boundary between at least one high-brightness region and the remaining regions (i.e., low-brightness regions). The operation of adjusting the composite weight will be described later with reference to FIGS. 8 to 12.

In still another embodiment, the image composition unit 320 may generate an HDR image by calculating the sum of a high-sensitivity image corresponding to a set of pixel data of the high-sensitivity pixels related to one scene and a low-sensitivity image corresponding to a set of pixel data of the low-sensitivity pixels related to one scene. Since the ratio of low-sensitivity pixels in the pixel array 110 is lower than the ratio of high-sensitivity pixels in the pixel array 110, the low-sensitivity image may have a lower resolution than the high-sensitivity image. Accordingly, the image composition unit 320 may first perform resolution conversion on the low-sensitivity image, and may calculate the sum of a high-sensitivity image and a low-sensitivity image that has been converted to have the same resolution as the high-sensitivity image.

In one embodiment, the resolution conversion for the low-sensitivity image may be performed prior to demosaicing. Demosaicing may be an operation for converting pixel data corresponding to one color (e.g., red, blue, or green) into pixel data corresponding to three colors (e.g., red, blue, and green). When demosaicing is performed on a Bayer pattern image (including pixel data corresponding to one color for each pixel), an RGB image (including pixel data corresponding to three colors for each pixel) may be formed. The reason why resolution conversion and demosaicing are sequentially performed is to prevent distortion caused by such demosaicing from being included in the HDR image by performing resolution conversion on the Bayer pattern image corresponding to an original image.

The ISP 300 may transmit image data (i.e., HDR image data) obtained by such image signal processing to the I/O interface 400.

In another embodiment, the gain processing unit 310 and the image composition unit 320 that are used to generate the HDR image may also be included in the image sensing device 100, rather than in the ISP 300.

The I/O interface 400 may perform communication with the host device 20, and may transmit the image signal processed (ISP) image data to the host device 20. In some implementations, the I/O interface 400 may be implemented as a mobile industry processor interface (MIPI), but is not limited thereto.

The host device 20 may be a processor (e.g., an application processor) for processing the ISP image data received from the imaging device 10, a memory (e.g., a non-volatile memory) for storing the ISP image data, or a display device (e.g., a liquid crystal display (LCD)) for visually displaying the ISP image data.

FIGS. 5A to 5D are schematic diagrams illustrating examples of implementing a high-sensitivity pixel (HPX) and a low-sensitivity pixel (LPX) in different ways according to a difference in light transmittance based on some implementations of the disclosed technology.

Figure 5A:
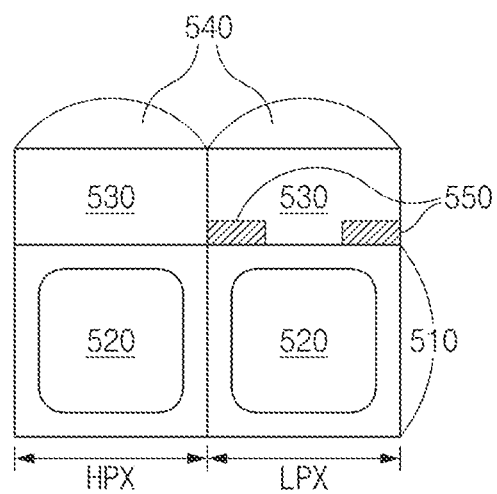
FIGS. 5A to 5D are schematic diagrams illustrating examples of implementing a high-sensitivity pixel and a low-sensitivity pixel in different ways according to a difference in light transmittance based on some implementations of the disclosed technology.

FIG. 5A is a diagram illustrating one example of the high-sensitivity pixel (HPX) and the low-sensitivity pixel (LPX) that are adjacent to each other.

Referring to FIG. 5A, the high-sensitivity pixel (HPX) and the low-sensitivity pixel (LPX) may partially overlap with the substrate 510, and may include a photoelectric conversion element 520, an optical filter 530, a microlens 540, and a first light blocking structure 550.

For example, the substrate 510 may be a P-type or N-type bulk substrate, may be a substrate formed by growing a P-type or N-type epitaxial layer on the P-type bulk substrate, or may be a substrate formed by growing a P-type or N-type epitaxial layer on the N-type bulk substrate.

The photoelectric conversion element 520 may be formed in the substrate 510. That is, the photoelectric conversion element 520 may generate and accumulate photocharges corresponding to the intensity of incident light having penetrated a microlens 540 and an optical filter 530.

The optical filters 530 may selectively transmit light (e.g., red light, green light, blue light, magenta light, yellow light, cyan light, infrared (IR) light, or the like) having a wavelength band to be transmitted. In this case, the wavelength band may refer to a wavelength band of light to be selectively transmitted by the corresponding optical filter. For example, each of the optical filters 530 may include a colored photosensitive material corresponding to a specific color, or may include thin film layers that are alternately arranged. The optical filters included in the pixel array 110 may be arranged to correspond to the pixels arranged in a matrix array including a plurality of rows and a plurality of columns, resulting in formation of an optical filter array.

Each of the microlenses 540 may be formed over each of the optical filters 530, and may increase light gathering power of incident light, resulting in increased light reception (Rx) efficiency of the photoelectric conversion element 520.

The first light blocking structure 550 may be disposed between one surface of the substrate 510 and the optical filter 530, so that at least a portion of incident light that has penetrated the optical filter 530 in the low-sensitivity pixel (LPX) is blocked by the first light blocking structure 550 without being transferred to the photoelectric conversion element 520. The first light blocking structure 550 may include at least one of a material (e.g., silver or aluminum) having a high light reflectivity and a material (e.g., tungsten) having a high light absorption rate.

The total area of the low-sensitivity pixel (LPX) may be defined as the sum of an opened area of a region where the first light blocking structure 550 is not disposed and a blocked area of a region where the first light blocking structure 550 is disposed. Light transmittance of the low-transmittance pixel (LPX) may be determined according to a ratio between the blocked area and the opened area.

The high-sensitivity pixel (HPX) not including the first light blocking structure 550 may have a higher light transmittance than the low-sensitivity pixel (LPX) including the first light blocking structure 550.

When incident light having the same intensity is incident upon the high-sensitivity pixel (HPX) and the low-sensitivity pixel (LPX), the intensity of light transferred to the photoelectric conversion element 520 of the low-sensitivity pixel (LPX) may be less than the intensity of light transferred to the photoelectric conversion element 520 of the high-sensitivity pixel (HPX).

In addition, the intensity of light transferred to the photoelectric conversion element 520 of the low-sensitivity pixel (LPX) may increase with a relatively lower slope in response to the increasing intensity of incident light. The intensity of light transferred to the photoelectric conversion element 520 of the high-sensitivity pixel (HPX) may increase with a relatively higher slope in response to the increasing intensity of incident light.

Since each of the intensity of light transferred to the photoelectric conversion element 520 of the low-sensitivity (LPX) and the intensity of light transferred to the photoelectric conversion element 520 of the high-sensitivity pixel (HPX) is converted into a pixel signal, the response of the low-sensitivity pixel (LPX) may follow the response of the low-sensitivity pixel shown in FIG. 4, and the response of the high-sensitivity pixel (HPX) may follow the response of the high-sensitivity pixel shown in FIG. 4.

Although the first light blocking structure 550 shown in FIG. 5A is disposed at the edge of the low-sensitivity pixel (LPX), other implementations are also possible. For example, the first light blocking structure 550 may be disposed at any location of the low-sensitivity pixel (LPX) corresponding to some parts of the low-sensitivity pixel (LPX).

The image sensing device 100 based on some implementations of the disclosed technology can simultaneously implement the low-sensitivity pixel and the high-sensitivity pixel within only one pixel array 110, and can thus form (or generate) the HDR image using only one image.

Figure 5B:
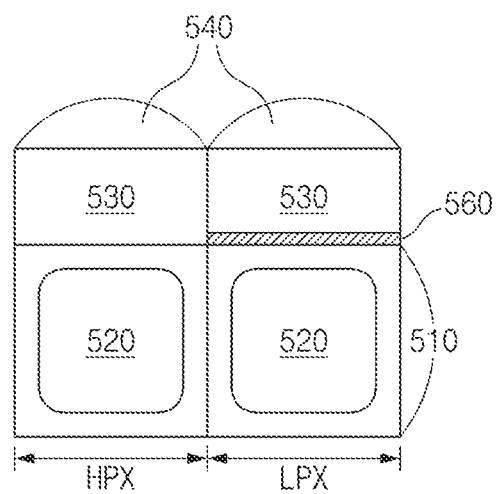

FIG. 5B is a diagram illustrating another example of the high-sensitivity pixel (HPX) and the low-sensitivity pixel (LPX) that are adjacent to each other.

Referring to FIG. 5B, the high-sensitivity pixel (HPX) and the low-sensitivity pixel (LPX) may partially overlap with the substrate 510, and may include a photoelectric conversion element 520, an optical filter 530, a microlens 540, and a second light blocking structure 560.

The substrate 510, the photoelectric conversion element 520, the optical filter 530, and the microlens 540 shown in FIG. 5B are substantially identical to those of FIG. 5A, and as such redundant description thereof will herein be omitted for convenience of description.

Unlike the first light blocking structure 550 shown in FIG. 5A, the second light blocking structure 560 shown in FIG. 5B may be disposed over the entire region of the low-sensitivity pixel (LPX) at a position between one surface of the substrate 510 and the optical filter 530. In addition, the second light blocking structure 560 may have a predetermined thickness to prevent at least a portion of incident light having penetrated the optical filter 530 from being transferred to the photoelectric conversion element 520. The second light blocking structure 560 may have a smaller thickness than the first light blocking structure 550.

The second light blocking structure 560 may include at least one of a material (e.g., silver or aluminum) having a high light reflectivity and a material (e.g., tungsten) having a high light absorption rate.

The high-sensitivity pixel (HPX) not including the second light blocking structure 560 may have a higher light transmittance than the low-sensitivity pixel (LPX) including the second light blocking structure 560.

Figure 5C:
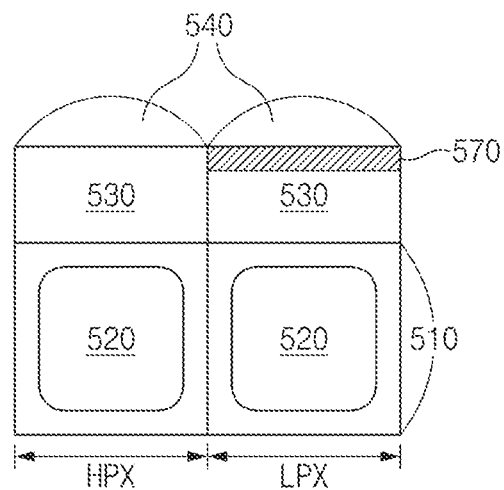

FIG. 5C is a diagram illustrating another example of the high-sensitivity pixel (HPX) and the low-sensitivity pixel (LPX) that are adjacent to each other.

Referring to FIG. 5C, the high-sensitivity pixel (HPX) and the low-sensitivity pixel (LPX) may partially overlap with the substrate 510, and may include a photoelectric conversion element 520, an optical filter 530, a microlens 540, and a third light blocking structure 570.

The substrate 510, the photoelectric conversion element 520, the optical filter 530, and the microlens 540 shown in FIG. 5C are substantially identical to those of FIG. 5A, and as such redundant description thereof will herein be omitted for convenience of description.

The third light blocking structure 570 shown in FIG. 5C may be disposed over the entire region of the low-sensitivity pixel (LPX) while being disposed between the optical filter 530 and the microlens 540. For example, the third light blocking structure 570 may be a neutral density (ND) filter capable of blocking at least a portion of light in the entire wavelength band regardless of color.

The high-sensitivity pixel (HPX) not including the third light blocking structure 570 may have a higher light transmittance than the low-sensitivity pixel (LPX) including the third light blocking structure 570.

Figure 5D:
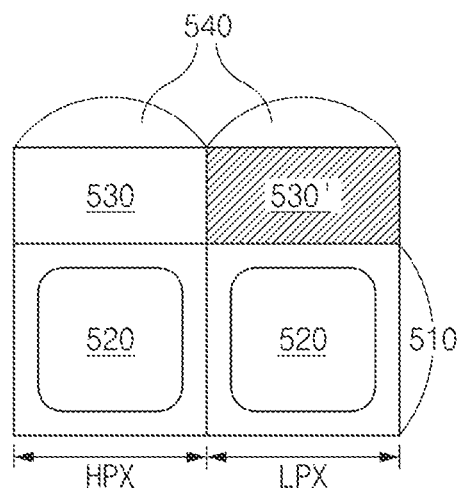

FIG. 5D is a diagram illustrating another example of the high-sensitivity pixel (HPX) and the low-sensitivity pixel (LPX) that are adjacent to each other.

Referring to FIG. 5D, the high-sensitivity pixel (HPX) and the low-sensitivity pixel (LPX) may partially overlap with the substrate 510, and may include a photoelectric conversion element 520, optical filters 530 and 530', and a microlens 540. In this implementation is, the low-sensitivity pixel (LPX) shown in FIG. 5D may not include a separate light blocking structure.

The substrate 510, the photoelectric conversion element 520, the optical filter 530, and the microlens 540 shown in FIG. 5D are substantially identical to those of FIG. 5A, and as such redundant description thereof will herein be omitted for convenience of description.

The optical filter 530' included in the low-sensitivity pixel (LPX) may have a lower light transmittance than the optical filter 530 included in the high-sensitivity pixel (HPX). Each of the optical filters 530 and 530' may include a colored photosensitive material corresponding to a specific color, or may include thin film layers that are alternately arranged. The photosensitive material included in the optical filter 530' may have a higher concentration than the photosensitive material included in the optical filter 530, or the number of thin film layers included in the optical filter 530' may be higher than the number of thin film layers included in the optical filter 530.

Accordingly, the high-sensitivity pixel (HPX) including the optical filter 530 may have a higher light transmittance than the low-sensitivity pixel (LPX) including the optical filter 530'.

Although FIGS. 5A to 5D illustrate various embodiments capable of implementing the high-sensitivity pixel (HPX) and the low-sensitivity pixel (LPX) for convenience of description, the scope or spirit of the disclosed technology is not limited thereto, and it should be noted that the high-sensitivity pixel (HPX) and the low-sensitivity pixel (LPX) can also be implemented using any structure capable of adjusting light transmittance.

In addition, the high-sensitivity pixel (HPX) and the low-sensitivity pixel (LPX) may be designed to have a light transmittance difference corresponding to a predetermined sensitivity difference (e.g., 16 times).

Figure 6A:
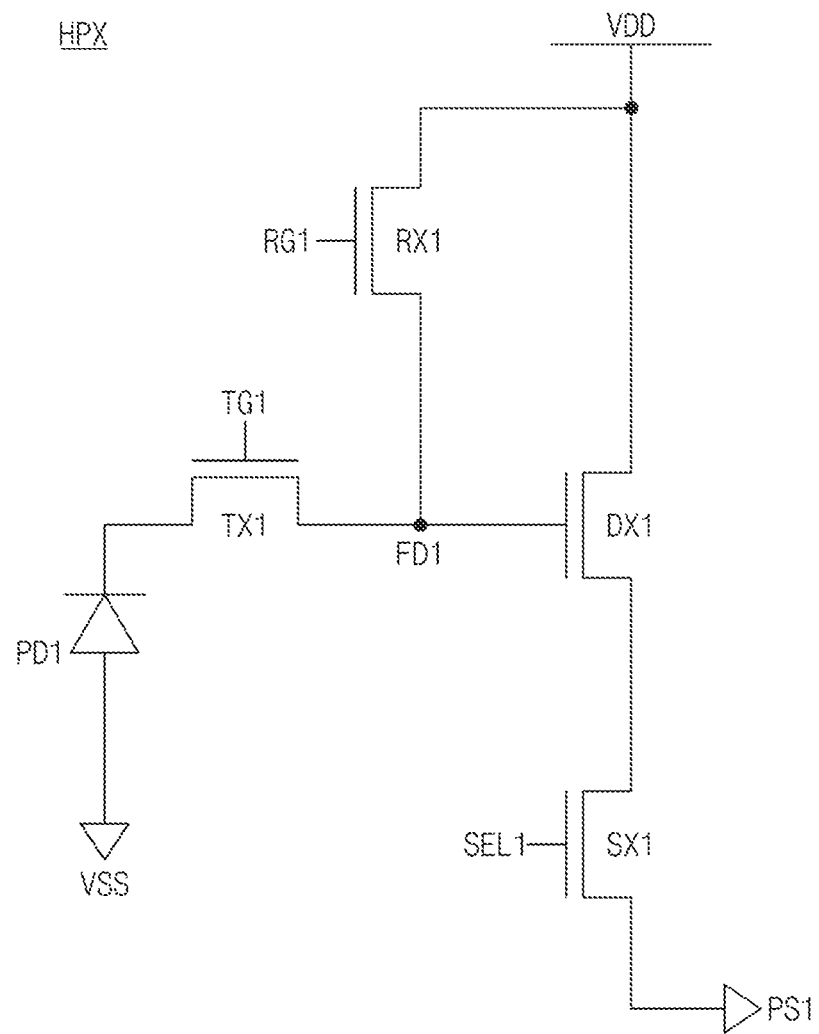
FIGS. 6A and 6B are diagrams illustrating examples of implementing a high-sensitivity pixel and a low-sensitivity pixel in different ways according to a difference in circuit structure based on some implementations of the disclosed technology.
Figure 6B:
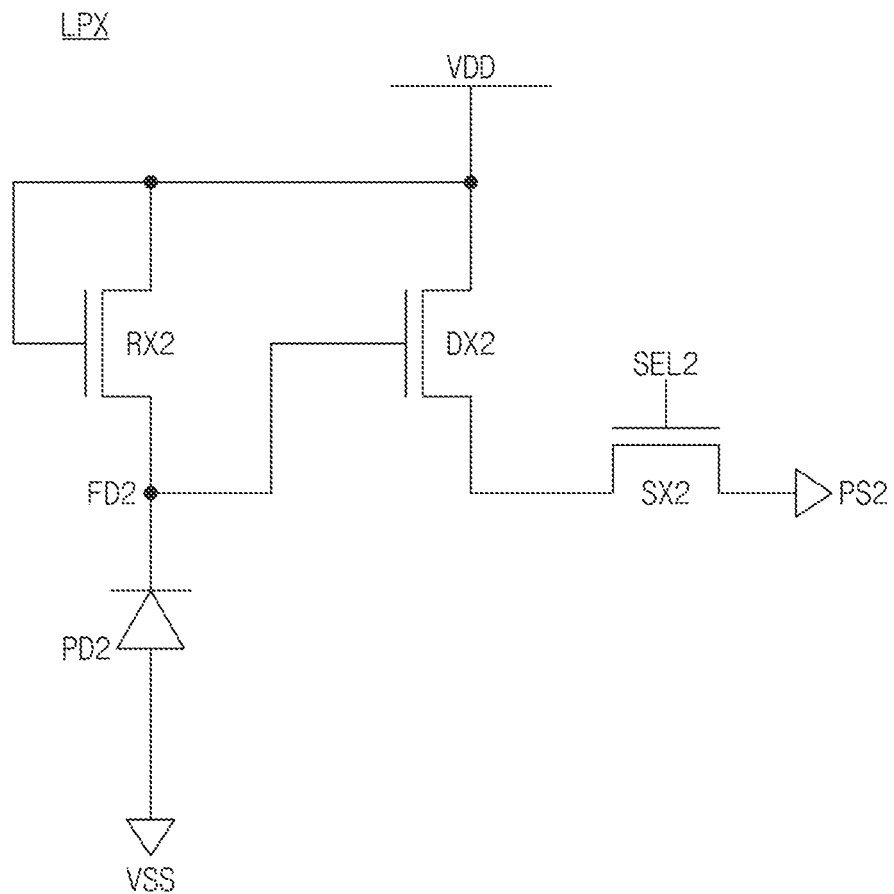

FIGS. 6A and 6B are diagrams illustrating examples of implementing the high-sensitivity pixel and the low-sensitivity pixel in different ways according to a difference in circuit structure based on some implementations of the disclosed technology.

FIG. 6A is a circuit diagram illustrating one example of an equivalent circuit of the high-sensitivity pixel (HPX).

Referring to FIG. 6A, the high-sensitivity pixel (HPX) may include a first photoelectric conversion element PD1, a first transfer transistor TX1, a first reset transistor RX1, a first floating diffusion region FD1, a first drive transistor DX1, and a first select transistor SX1. That is, the high-sensitivity pixel (HPX) may have a 4TR (four-transistor) pixel structure.

The first photoelectric conversion element PD1 may generate and accumulate photocharges corresponding to the intensity of incident light. For example, the first photoelectric conversion element PD1 may be implemented as a photodiode, a phototransistor, a photogate, a pinned photodiode or a combination thereof.

If the first photoelectric conversion element PD1 is implemented as a photodiode, the first photoelectric conversion element PD1 may be a region that is doped with second conductive impurities (e.g., N-type impurities) in a substrate including first conductive impurities (e.g., P-type impurities).

The first transfer transistor TX1 may be coupled between the first photoelectric conversion element PD1 and the first floating diffusion region FD1. The first transfer transistor TX1 may be turned on or off in response to a first transfer control signal TG1. If the first transfer transistor TX1 is turned on, photocharges accumulated in the first photoelectric conversion element PD1 can be transmitted to the first floating diffusion region FD1.

The first reset transistor RX1 may be disposed between the first floating diffusion region FD1 and the power-supply voltage (VDD), and the voltage of the first floating diffusion region FD1 can be reset to the power-supply voltage (VDD) in response to a first reset control signal RG1.

The first floating diffusion region FD1 may accumulate photocharges received from the first transfer transistor TX1. For example, the first floating diffusion region FD1 may be a region that is doped with second conductive impurities (e.g., N-type impurities) in a substrate (e.g., a P-type substrate) including first conductive impurities. In this case, the substrate and the impurity doped region can be modeled as the first capacitor (C1) acting as a junction capacitor.

The first drive transistor DX1 may be coupled between the power-supply voltage (VDD) and the first select transistor SX1, may amplify a change in electrical potential of the first floating diffusion region FD1 that has received photocharges accumulated in the first photoelectric conversion element PD1, and may transmit the amplified result to the first select transistor SX1.

The first select transistor SX1 may be coupled between the first drive transistor DX1 and the output signal line, and may be turned on by the first selection control signal SEL1, so that the first select transistor SX1 can output the electrical signal received from the first drive transistor DX1 as a first pixel signal PS1.

FIG. 6B is a circuit diagram illustrating one example of an equivalent circuit of the low-sensitivity pixel (LPX).

Referring to FIG. 6B, the low-sensitivity pixel (LPX) may include a second photoelectric conversion element PD2, a second reset transistor RX2, a second floating diffusion region FD2, a second drive transistor DX2, and a second select transistor SX2. That is, the low-sensitivity pixel (LPX) may have a 3TR (three-transistor) pixel structure.

The basic structures and functions of the second photoelectric conversion element PD2, the second reset transistor RX2, the second floating diffusion region FD2, the second drive transistor DX2, and the second select transistor SX2 shown in FIG. 6B are similar to those of the first photoelectric conversion element PD1, the first reset transistor RX1, the first floating diffusion region FD1, the first drive transistor DX1, and the first select transistor SX1 shown in FIG. 6A, and as such redundant description thereof will herein be omitted for brevity. For convenience of description, the above-mentioned constituent elements shown in FIG. 6B will hereinafter be described centering upon characteristics different from those of FIG. 6A.

The low-sensitivity pixel (LPX) may not include a separate transfer transistor, and the second photoelectric conversion element PD2 may be directly coupled to a source of the second reset transistor RX2 and a gate of the second drive transistor DX2.

In addition, the gate of the second reset transistor RX2 may be coupled to the power-supply voltage (VDD), and the second reset transistor RX2 may operate in a triode region. That is, as photocharges corresponding to the intensity of incident light are generated and accumulated in the second photoelectric conversion element PD2, the voltage of the second floating diffusion region FD2 may decrease in proportion to the amount of photocharges. Accordingly, a current proportional to voltage drop of the second floating diffusion region FD2 may flow in each of the second reset transistor RX2 and the second photoelectric conversion element PD2, and a second pixel signal PS2 corresponding to the magnitude of current may be output through the second drive transistor DX2 and the second select transistor SX2.

As described above, the operation of the second reset transistor RX2 configured to generate the current corresponding to the amount of photocharges generated by the second photoelectric conversion element PD2 may be defined as a logarithmic operation. Due to this logarithmic operation, even when the intensity of incident light that may cause saturation in the first photoelectric conversion element PD1 or the first floating diffusion region FD1 within the high-sensitivity pixel (HPX) is provided, the low-sensitivity pixel (LPX) may generate a valid second pixel signal PS2 corresponding to such intensity of incident light. In this case, the second reset transistor RX2 will hereinafter be referred to as a logarithmic transistor.

According to one embodiment, the low-sensitivity pixel (LPX) may not generate a reference signal, such that the correlated double sampling (CDS) operation for the second pixel signal PS2 generated by the low-sensitivity pixel (LPX) may be omitted.

Strictly speaking, the high-sensitivity pixel (HPX) and the low-sensitivity pixel (LPX) shown in FIGS. 6A and 6B are not used to establish a difference in sensitivity between two pixels, so that it may be more preferable that the respective pixels be referred to as a normal pixel and be referred to as an HDR pixel for HDR image formation for convenience of description and better understanding of the disclosed technology.

The embodiments shown in FIGS. 6A and FIG. 6B may be combined with the embodiments of FIGS. 5A to 5D without being mutually exclusive. For example, the high-sensitivity pixel (HPX) and the low-sensitivity pixel (LPX) shown in the cross-sectional view of FIG. 5A may be denoted by the circuit structure of FIG. 6A and the circuit structure of FIG. 6B, respectively.

Figure 7:
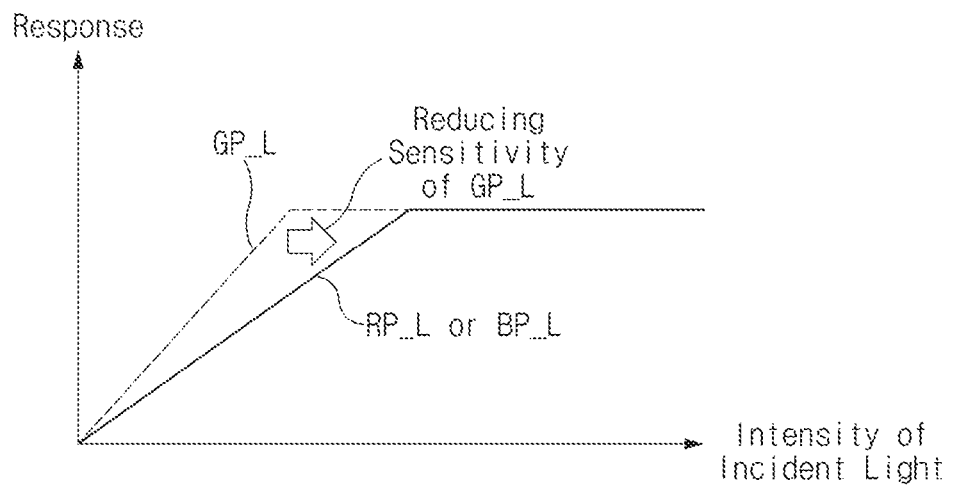
FIG. 7 is a graph illustrating an example of responses depending on illuminance of incident light applied to each of a low-sensitivity green pixel, a low-sensitivity red pixel, and a low-sensitivity blue pixel based on some implementations of the disclosed technology.

FIG. 7 is a graph illustrating an example of responses depending on illuminance of incident light applied to each of a low-sensitivity green pixel, a low-sensitivity red pixel, and a low-sensitivity blue pixel based on some implementations of the disclosed technology.

Referring to FIG. 7, in association with a low-sensitivity green pixel (GP_L), a low-sensitivity red pixel (RP_L), and a low-sensitivity blue pixel (BP_L), a response of the low-sensitivity green pixel (GP_L) in response to the intensity of incident light applied to the low-sensitivity green pixel (GP_L), a response of the low-sensitivity red pixel (RP_L) in response to the intensity of incident light applied to the low-sensitivity red pixel (RP_L), and a response of the low-sensitivity blue pixel (BP_L) in response to the intensity of incident light applied to the low-sensitivity blue pixel (BP_L) are illustrated.

The low-sensitivity green pixel (GP_L) may include a green color filter, the low-sensitivity red pixel (RP_L) may include a red color filter, and the low-sensitivity blue pixel (BP_L) may include a blue color filter. Due to characteristics of the respective color filters, the sensitivity of the low-sensitivity green pixel (GP_L) may be (about two times) higher than the sensitivity of the low-sensitivity red pixel (RP_L) or the sensitivity of the low-sensitivity blue pixel (BP_L). In this case, it is assumed that the sensitivity of the low-sensitivity red pixel (RP_L) is substantially identical to the sensitivity of the low-sensitivity blue pixel (BP_L).

As can be seen from FIG. 7, the response of the low-sensitivity green pixel (GP_L) may be saturated while increasing with a relatively higher slope in response to the increasing intensity of incident light, and the response of the low-sensitivity red pixel (RP_L) and the response of the low-sensitivity blue pixel (BP_L) may be saturated while increasing with a relatively lower slope in response to the increasing intensity of incident light.

The sensitivity difference and the response difference among the low-sensitivity green pixel (GP_L), the low-sensitivity red pixel (RP_L), and the low-sensitivity blue pixel (BP_L) may cause the problem that the responses of the different colors of pixels configured to receive the same intensity of incident light are changed. In particular, noise may occur in the HDR image under the high-illuminance condition where the HDR image should be generated using the low-sensitivity pixels.

Therefore, it is necessary for the response of the low-sensitivity green pixel (GP_L), the response of the low-sensitivity red pixel (RP_L), and the response of the low-sensitivity blue pixel (BP_L) to be identical to each other. To this end, the sensitivity of the low-sensitivity green pixel (GP_L) may be designed to be lower than the sensitivity of the low-sensitivity red pixel (RP_L) or the sensitivity of the low-sensitivity blue pixel (BP_L). For example, when each of the low-sensitivity green pixel (GP_L), the low-sensitivity red pixel (RP_L), and the low-sensitivity blue pixel (BP_L) has the structure of the low-sensitivity pixel (LPX) shown in FIG. 5A, the opening of the low-sensitivity green pixel (GP_L) may be smaller in size than the opening of the low-sensitivity red pixel (RP_L) or the opening of the low-sensitivity blue pixel (BP_L).

Figure 8:
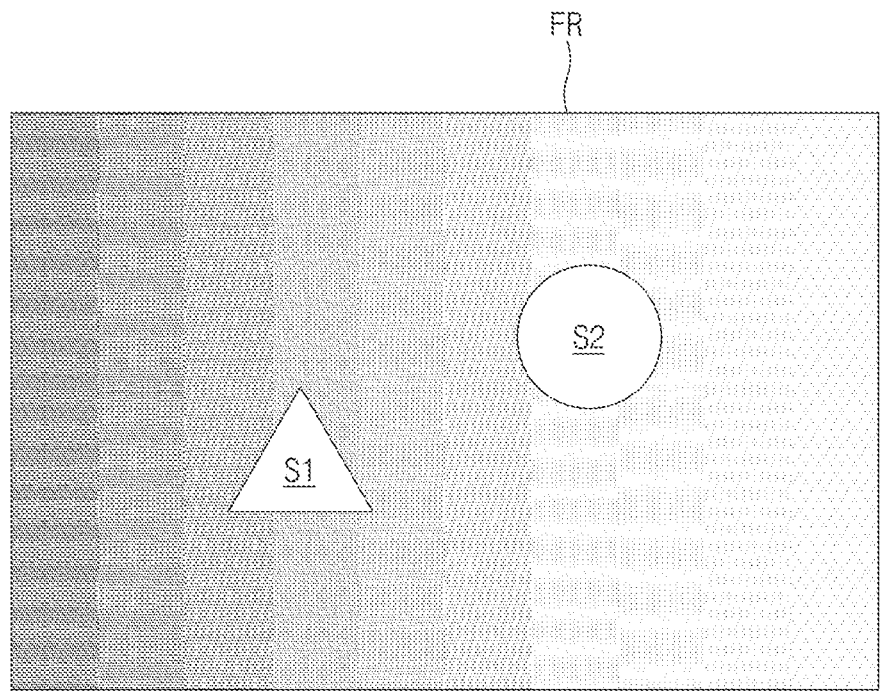
FIG. 8 is a diagram illustrating an example of one frame generated by the image sensing device based on some implementations of the disclosed technology.

FIG. 8 is a diagram illustrating an example of one frame generated by the image sensing device 100 based on some implementations of the disclosed technology.

Referring to FIG. 8, the plurality of pixels of the pixel array 110 may simultaneously sense one scene, and the image sensing device 100 may provide the ISP 300 with a set of pixel data used to sense one scene through the line memory 200. In this case, the set of pixel data used to sense one scene may be defined as a frame (FR) shown in FIG. 8.

The image composition unit 320 of the ISP 300 may determine a high-brightness region based on pixel data of the high-sensitivity pixel included in the frame (FR).

The high-brightness region may refer to a region in which the ratio of high-sensitivity pixels, each of which has saturated pixel data for each unit pixel group, is higher than a predetermined ratio (e.g., 90%). For example, the unit pixel group may include 64 pixels shown in FIG. 3, and other implementations are also possible.

Assuming that the ratio of high-sensitivity pixels, each of which has saturated pixel data for each unit pixel group in each of the first high-brightness region S1 and the second high-brightness region S2, is higher than a predetermined ratio, the image composition unit 320 may determine each of the first high-brightness region S1 and the second high-brightness region S2 to be the high-brightness region.

In contrast, assuming that the ratio of high-sensitivity pixels, each of which has saturated pixel data for each unit pixel group in the remaining regions other than the first high-brightness region S1 and the second high-brightness region S2, is equal to or less than a predetermined ratio, the image composition unit 320 may determine each of the remaining regions other than the first high-brightness region S1 and the second high-brightness region S2 to be the low-brightness region.

In addition, it is assumed that the overall brightness gradually increases in the direction from the left side to the right side of the frame (FR). For example, the increase in the overall brightness may indicate that an average value of pixel data of the high-sensitivity pixels increases.

As can be seen from FIG. 8, when one or more high-brightness regions S1 and S2 exist in one frame (FR), the image composition unit 320 may use pixel data of low-sensitivity pixels in at least one of the high-brightness regions S1 and S2, and may generate the HDR image using pixel data of high-sensitivity pixels in the remaining regions (i.e., low-brightness regions) other than the one or more high-brightness regions S1 and S2.

Specifically, since most high-sensitivity pixels are saturated in at least one of the high-brightness regions S1 and S2, the image composition unit 320 may apply a first value obtained when a gain (e.g., 16) caused by a difference in sensitivity (e.g., 16 times difference in sensitivity) between the high-sensitivity pixel and the low-sensitivity pixel is calculated, and a second value obtained by interpolation of the first value, to a process of determining the HDR image for at least one of the high-brightness regions S1 and S2. In the at least one of the high-brightness regions S1 and S2, the ratio of low-sensitivity pixels is less than the ratio of high-sensitivity pixels, and the image captured by the low-sensitivity pixel has a lower resolution. As a result, most of high-sensitivity pixels are saturated (i.e., in a state having little image information), so that it may be more advantageous to generate the HDR image using pixel data of the low-sensitivity pixels.

In addition, since most high-sensitivity pixels are not saturated in the remaining regions (i.e., the low-brightness regions) other than the one or more high-brightness regions S1 and S2, the image composition unit 320 may apply both pixel data of the high-sensitivity pixels and a value obtained by interpolation of the pixel data to a process of determining the HDR image for the remaining regions (i.e., low-brightness regions) other than the one or more high-brightness regions S1 and S2.

Figure 9:
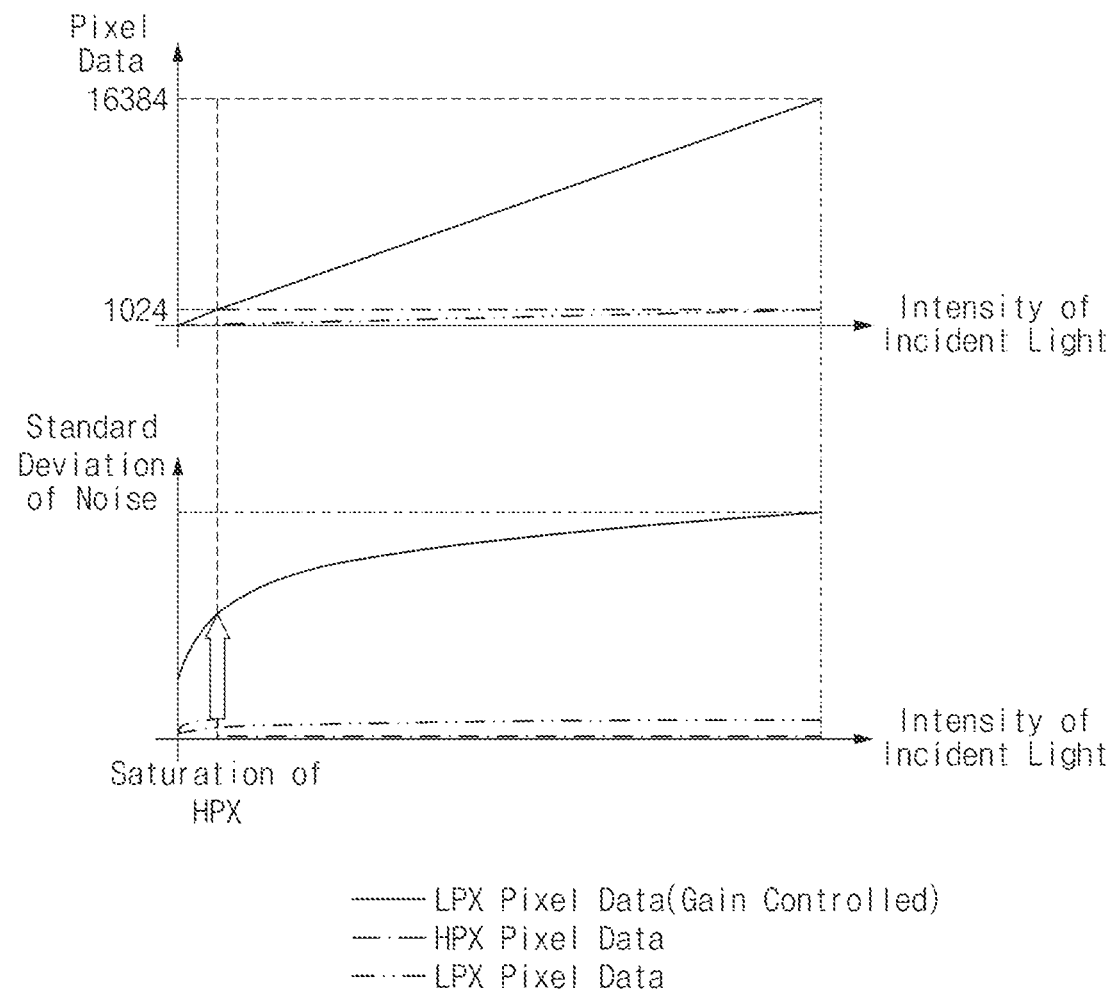
FIG. 9 is a graph illustrating the result of comparison between pixel data and noise with respect to a high-sensitivity pixel and a low-sensitivity pixel based on some implementations of the disclosed technology.

FIG. 9 is a graph illustrating the result of comparison between pixel data and noise with respect to the high-sensitivity pixel and the low-sensitivity pixel based on some implementations of the disclosed technology.

Referring to FIG. 9, pixel data (HPX pixel data) of the high-sensitivity pixel according to the intensity (or illuminance) of incident light and pixel data (LPX pixel data) of the low-sensitivity pixel are depicted in an upper side of FIG. 9.

In this case, it is assumed that a difference in sensitivity between the high-sensitivity pixel and the low-sensitivity pixel is 16 times, such that a gain of 16 can be multiplied by pixel data of the low-sensitivity pixel in the process of forming the HDR image. As depicted in the upper side of FIG. 9, pixel data "LPX pixel data (gain controlled)" of the gain-controlled low-sensitivity pixel obtained when the gain is multiplied by pixel data of the low-sensitivity pixel may be formed in a shape in which pixel data of the low-sensitivity pixel is magnified 16 times in the Y-axis direction.

Assuming that pixel data in which the high-sensitivity pixel and the low-sensitivity pixel are saturated is denoted by 1024, even when the high-sensitivity pixel is saturated (denoted by "saturation of HPX") in response to the increasing intensity of incident light, the dynamic range can be expanded to the intensity of incident light corresponding to pixel data having a dynamic range of 16384 by pixel data of a gain-controlled low-sensitivity pixel.

When generating the HDR image, it is more preferable that pixel data of a high-sensitivity pixel having a high SNR (signal to noise ratio) be used at an illuminance condition where illuminance is less than the intensity of incident light by which the high-sensitivity pixel is saturated, and it is more preferable that a gain of pixel data of a low-sensitivity pixel instead of pixel data of the saturated high-sensitivity pixel be controlled and used at an illuminance condition where illuminance is higher than the intensity of incident light by which the high-sensitivity pixel is saturated.

In contrast, the lower side of FIG. 9 illustrates a standard deviation of noise for each of pixel data of the high-sensitivity pixel, pixel data of the low-sensitivity pixel, and pixel data of the gain-controlled low-sensitivity pixel according to the intensity of incident light. In this case, the standard deviation of noise (hereinafter referred to as a noise standard deviation) may refer to the intensity of shot noise. Each pixel data may include shot noise caused by random characteristics of photons constituting the incident light. Since the shot noise is caused by photons, the shot noise may increase in response to the increasing intensity of incident light.

Therefore, as the intensity of incident light increases, the noise standard deviation for pixel data of the high-sensitivity pixel and the noise standard deviation for pixel data of the low-sensitivity pixel may increase until each pixel is saturated (in the saturated state, photons are not introduced into each pixel, so that the noise standard deviation is considered meaningless).

Also, at the same intensity of incident light, the noise standard deviation for pixel data of the high-sensitivity pixel having a relatively higher sensitivity may be larger than the noise standard deviation for pixel data of the low-sensitivity pixel having a relatively lower sensitivity. On the other hand, since pixel data of the gain-controlled low-sensitivity pixel is a value obtained by multiplying pixel data of the low-sensitivity pixel by a predetermined gain (e.g., 16 times), the noise standard deviation may also increase by a predetermined gain (e.g., 16 times) compared to pixel data of the low-sensitivity pixel.

As described above, in the illuminance condition where illuminance is less than the intensity of incident light by which the high-sensitivity pixel is saturated, the HDR image may be generated using pixel data of the high-sensitivity pixel. In the illuminance condition where illuminance is higher than the intensity of incident light by which the high-sensitivity pixel is saturated, when the HDR image is generated using pixel data of the gain-controlled low-sensitivity pixel, a sudden difference in shot noise may occur based on the intensity of incident light by which the high-sensitivity pixel is saturated.

If the HDR image is generated using pixel data of the high-sensitivity pixel within a partial region of one frame (FR), and if the HDR image is generated using pixel data of the low-sensitivity pixel within the other adjacent region of the one frame (FR), image quality deterioration caused by a sudden difference in shot noise may occur in the vicinity of a boundary between two regions.

Figure 10:
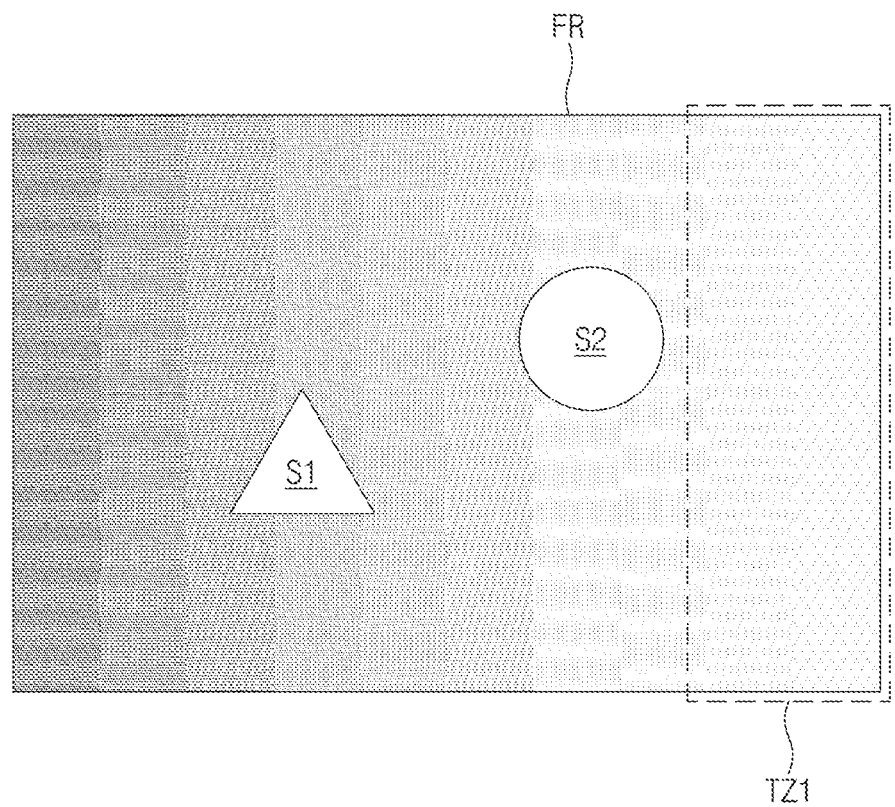
FIG. 10 is a diagram illustrating one example of a method for establishing a composite weight based on some implementations of the disclosed technology.

FIG. 10 is a diagram illustrating one example of a method for establishing a composite weight based on some implementations of the disclosed technology.

Referring to FIG. 10, when the overall brightness gradually increases in the direction from the left side to the right side of the frame (FR) as shown in FIG. 8, the image composition unit 320 may determine a partial region of the right end of the frame (FR) to be a first transition zone TZ1. In the first transition zone TZ1, the ratio of high-sensitivity pixels each having saturated pixel data for each unit pixel group does not exceed a predetermined ratio, but a minimum ratio of high-sensitivity pixels may be equal to or higher than a minimum ratio (e.g., 70%) and directivity in which the overall brightness increases (e.g., left side→right side) may appear.

In the first transition zone TZ1, the image composition unit 320 may combine pixel data of the low-sensitivity pixels and pixel data of the high-sensitivity pixels using a first composite weight, thereby generating the HDR image. The first composite weight may be a value having the range of 0 to 1, and may refer to a weight that is allocated to pixel data of the high-sensitivity pixels.

Specifically, in the first transition zone TZ1, the image composition unit 320 may determine the sum of a first value and a second value to be the HDR image for low-sensitivity pixels. In this case, the first value is obtained when a first composite weight is multiplied by a resultant value obtained by interpolation of pixel data of the high-sensitivity pixel, and the second value is obtained when a value (denoted by "1—first composite weight") is multiplied by a resultant value obtained by arithmetic calculation between a gain and pixel data of the low-sensitivity pixel.

According to one embodiment, the first composite weight may be gradually changed in the first transition zone TZ1. For example, at the left end of the first transition zone TZ1, the first composite weight may be set to 1. The first composite weight may be gradually reduced in the direction from the left end to the right end within the first transition zone TZ1, so that the first composite weight may be set to 0.1 at the right end of the first transition zone TZ1 within the first transition zone TZ1.

According to a method for establishing the composite weight, pixel data of the low-sensitivity pixel may be partially reflected in the region where the ratio of saturated high-sensitivity pixels is relatively high, so that the HDR image having an expanded dynamic range can be obtained. In addition, the first composite weight may be changed according to average brightness, so that the HDR image in which the dynamic range and the SNR are optimized can be obtained.

Figure 11:
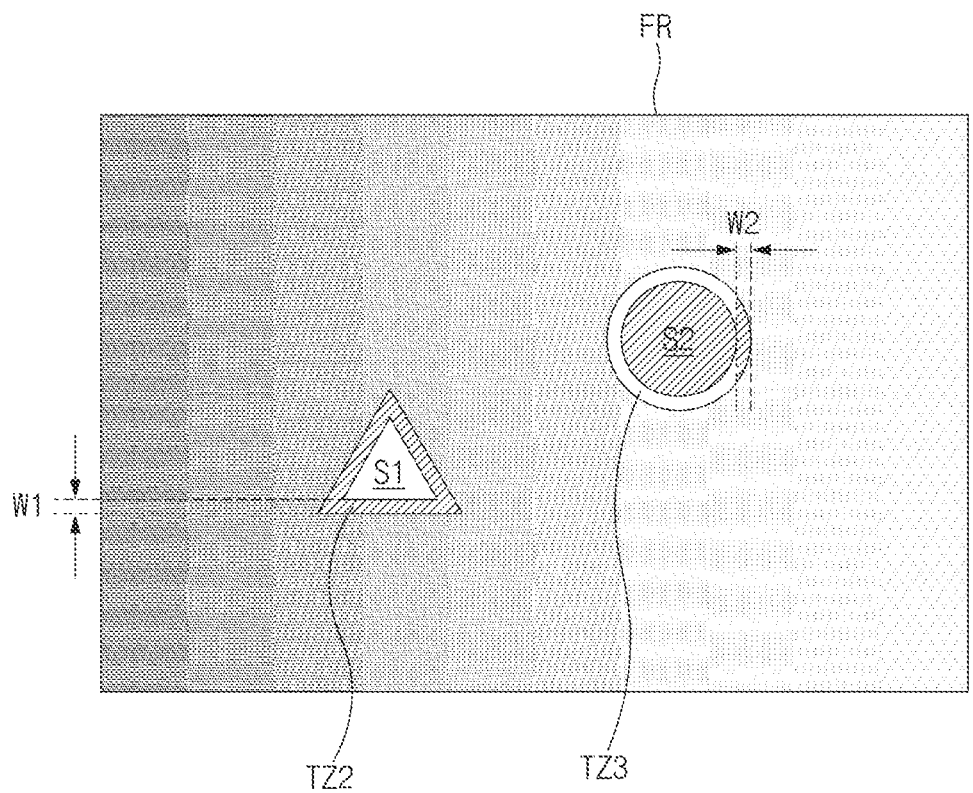
FIG. 11 is a diagram illustrating another example of a method for establishing a composite weight based on some implementations of the disclosed technology.

FIG. 11 is a diagram illustrating another example of a method for establishing a composite weight based on some implementations of the disclosed technology.

Referring to FIG. 11, when a first high-brightness region S1 and a second high-brightness region S2 are included as shown in FIG. 8, the image composition unit 320 may determine a low-brightness region (or a region surrounding the first high-brightness region S1) adjacent to a boundary between the low-brightness region and the first high-brightness region S1 to be a second transition zone TZ2, and may determine a low-brightness region (or a region surrounding the second high-brightness region S2) adjacent to a boundary between the low-brightness region and the second high-brightness region S2 to be a third transition zone TZ3.

As described above, when at least one high-brightness region S1 and S2 is present in one frame (FR), the image composition unit 320 may use pixel data of the low-sensitivity pixels in the at least one high-brightness region S1 and S2, and may generate the HDR image using pixel data of the high-sensitivity pixels within the remaining regions (or in the low-brightness region) other than the at least one high-brightness region S1 and S2. In this case, there may be a very large difference in shot noise between pixel data of the low-sensitivity pixels and pixel data of the high-sensitivity pixels.

Accordingly, the image composition unit 320 may determine the region surrounding the first high-brightness region S1 to be the second transition zone TZ2. In the second transition zone TZ2, the image composition unit 320 may combine pixel data of the low-sensitivity pixels and pixel data of the high-sensitivity pixels using a second composite weight, resulting in formation of the HDR image. The second composite weight may be a value having the range of 0 to 1, and may refer to a weight allocated to pixel data of the high-sensitivity pixels.

In addition, the image composition unit 320 may determine the region surrounding the second high-brightness region S2 to be a third transition zone TZ3. In the third transition zone TZ3, the image composition unit 320 may combine pixel data of the low-sensitivity pixels and pixel data of the high-sensitivity pixels using a third composite weight, resulting in formation of the HDR image. The third composite weight may be a value having the range of 0 to 1, and may refer to a weight allocated to pixel data of the high-sensitivity pixels.

A method for generating the HDR image through combination of pixel data based on either the second composite weight or the third composite weight is substantially identical to the method for generating the HDR image through combination of pixel data based on the first composite weight shown in FIG. 10, and as such redundant description thereof will herein be omitted for convenience of description.

According to one embodiment, the second composite weight or the third composite weight may be gradually changed in the second or third transition zone TZ3 or TZ3. For example, the second composite weight may be set to 1 at the outer end of the second transition zone TZ2 (i.e., at the position located farthest from the boundary between the first high-brightness region S1 and the low-brightness region). The second composite weight may gradually decrease in the direction from the outer end to the inner end of the second transition zone TZ2, so that the second composite weight may become zero at the inner end of the second transition zone TZ2 (i.e., at the boundary between the first high-brightness region S1 and the low-brightness region). In addition, the third composite weight may be set to 1 at the outer end of the third transition zone TZ3, and may gradually decrease in the direction from the outer end to the inner end of the third transition zone TZ3, so that the third composite weight may become zero at the inner end of the third transition zone TZ3.

According to the method for establishing the composite weight, pixel data of the low-sensitivity pixel and pixel data of the low-sensitivity pixel may be combined with each other using a specific composite weight within the region located around the boundary between the high-brightness region and the remaining regions other than the high-brightness region, and the second and third composite weights may be changed according to the distance to the high-brightness region, resulting in formation of the HDR image in which image quality deterioration caused by a difference in noise is mitigated.

According to one embodiment, a first width W1 of the second transition zone TZ2 and a second width W2 of the third transition zone TZ3 may be determined by an average value of pixel data of high-sensitivity pixels located adjacent to the first high-brightness region S1 and the second high-brightness region S2. Here, the high-sensitivity pixels adjacent to each of the first high-brightness region S1 and the second high-brightness region S2 may refer to high-sensitivity pixels included within a predetermined distance from each of the first high-brightness region S1 and the second high-brightness region S2. Each of the first width W1 of the second transition zone TZ2 and the second width W2 of the third transition zone TZ3 may be reduced as the average value of pixel data of the corresponding high-sensitivity pixels decreases, and may increase as the average value of pixel data of the corresponding high-sensitivity pixels increases. This is because, when a difference in brightness between each of the first high-brightness region S1 and the second high-brightness region S2 and the adjacent region is relatively large, a sense of incompatibility caused by a difference in shot noise may be relatively small. For example, as can be seen from FIG. 11, the first width W1 of the second transition zone TZ2 may be smaller than the second width W2 of the third transition zone TZ3.

Figure 12:
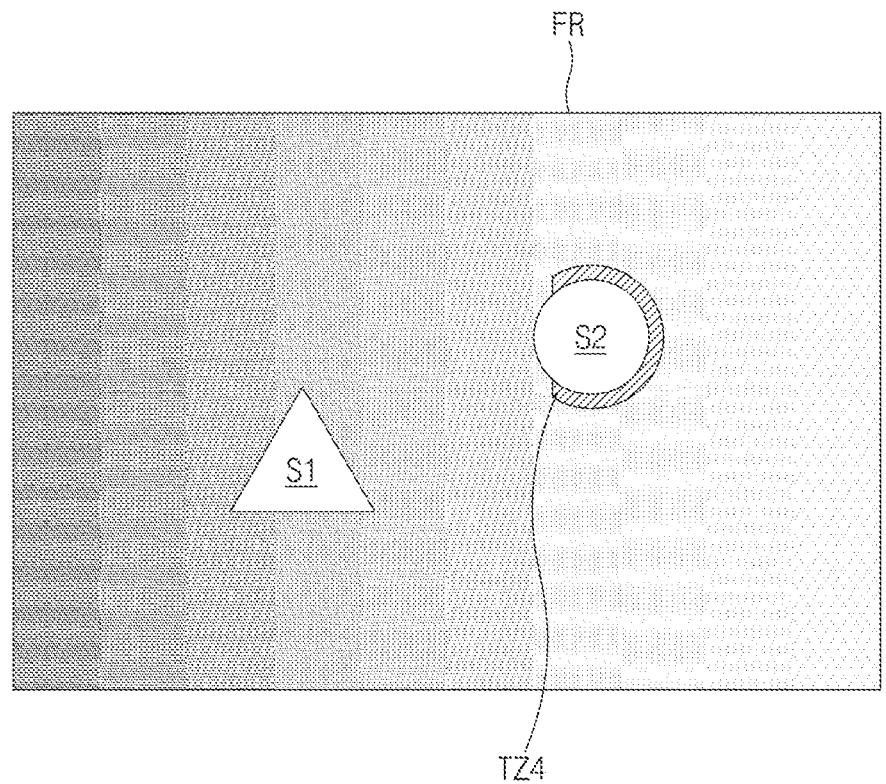
FIG. 12 is a diagram illustrating still another example of a method for establishing a composite weight based on some implementations of the disclosed technology.

FIG. 12 is a diagram illustrating still another example of a method for establishing a composite weight based on some implementations of the disclosed technology.

Referring to FIG. 12, when the first high-brightness region S1 and the second high-brightness region S2 are included in the frame (FR) as shown in FIG. 8, the image composition unit 320 may determine some parts of the region surrounding the second high-brightness region S2 to be a fourth transition zone TZ4.

That is, the image composition unit 320 may determine some parts of the region surrounding the second high-brightness region S2 to be the fourth transition zone TZ4 without determining the region surrounding the first high-brightness region S1 to be the transition zone. In the fourth transition zone TZ4, the image composition unit 320 may combine pixel data of the low-sensitivity pixels and pixel data of the high-sensitivity pixels using the fourth composite weight, resulting in formation of the HDR image. The fourth composite weight may be a value having the range of 0 to 1, and may refer to a weight allocated to pixel data of the high-sensitivity pixels. A method for generating the HDR image through combination of pixel data based on the fourth composite weight is substantially identical to the method for generating the HDR image through combination of pixel data based on the first composite weight shown in FIG. 10, and as such redundant description thereof will herein be omitted for convenience of description.

According to one embodiment, the fourth composite weight may be gradually changed in the fourth transition zone TZ4. For example, the fourth composite weight may be set to 1 at the outer end of the fourth transition zone TZ4, and may gradually decrease in the direction from the outer end to the inner end of the fourth transition zone TZ4, so that the fourth composite weight may become zero at the inner end of the fourth transition zone TZ4.

Differently from FIG. 11, for the first high-brightness region S1 and the second high-brightness region S2, the image composition unit 320 may determine only some parts of the region surrounding the second high-brightness region S2 to be the fourth transition zone TZ4.

That is, the image composition unit 320 may set a transition zone only for a region where the average value of the pixel data of high-sensitivity pixels adjacent to each of the first high-brightness region S1 and the second high-brightness region S2 is higher than a predetermined threshold. In the example of FIG. 12, the average value of pixel data of some high-sensitivity pixels corresponding to the fourth transition zone TZ4 among the high-sensitivity pixels adjacent to each of the first high-brightness region S1 and the second high-brightness region S2 may exceed a predetermined threshold.

As described above, the reason why the transition zone is set only in the region satisfying a specific condition within the peripheral region of the brightness region is as follows. When a difference in brightness between each of the first high-brightness region S1 and the second high-brightness region S2 and the adjacent region is relatively large, the sense of incompatibility caused by a difference in shot noise is relatively small. As a result, a method for preventing SNR degradation caused by a combination between pixel data of low-sensitivity pixels and pixel data of high-sensitivity pixels may be considered more effective as compared to the method for mitigating a difference in noise.

Figure 13:
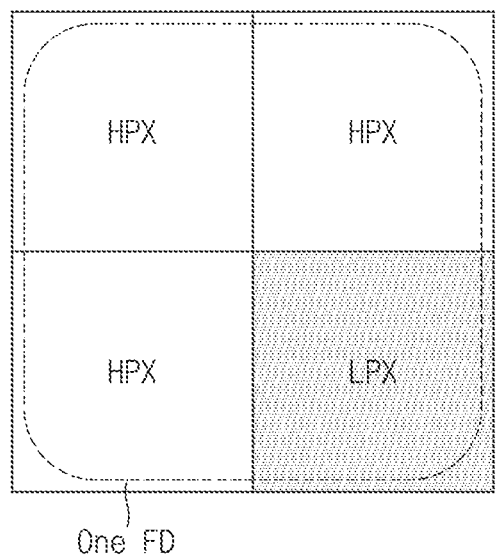
FIG. 13 is a diagram illustrating one example of an arrangement of a high-sensitivity pixel and a low-sensitivity pixel based on some implementations of the disclosed technology.

FIG. 13 is a diagram illustrating one example of an arrangement of the high-sensitivity pixel and the low-sensitivity pixel based on some implementations of the disclosed technology.

Referring to FIG. 13, one example of the arrangement of the high-sensitivity pixel (HPX) and the low-sensitivity pixel (LPX) is illustrated. That is, three high-sensitivity pixels (HPX) and one low-sensitivity pixel (LPX) may be arranged in a (2×2) matrix (i.e., a unit matrix). Although the low-sensitivity pixels (LPX) are disposed at a position corresponding to the second row and the second column of the (2×2) matrix, other implementations are also possible, and it should be noted that the low-sensitivity pixels (LPX) can also be disposed at any location of the (2×2) matrix. In addition, the high-sensitivity pixels (HPX) and the low-sensitivity pixels (LPX) may include the same type of optical filters.

Each of the high-sensitivity pixel (HPX) and the low-sensitivity pixel (LPX) may independently include a photoelectric conversion element and a transfer transistor, and the remaining structures can be implemented as a shared pixel structure that is shared by four pixels. That is, the high-sensitivity pixel (HPX) and the low-sensitivity pixel (LPX) may share only one floating diffusion region ("one FD" in FIG. 13).

The shared pixel composed of the high-sensitivity pixels (HPX) and the low-sensitivity pixels (LPX) may operate in a quad mode or a binning mode. In this case, the quad mode may refer to a mode in which a pixel signal corresponding to photocharges generated in the high-sensitivity pixels (HPX) and a pixel signal corresponding to photocharges generated in the low-sensitivity pixels (LPX) are sequentially output at different time points. The binning mode may refer to a mode in which a pixel signal corresponding to the entire photocharges generated in each of the high-sensitivity pixel (HPX) and the low-sensitivity pixel (LPX) is output once. Whereas the binning mode may be disadvantageous in terms of resolution as compared to the quad mode (the resolution is reduced to ¼), the binning mode can directly obtain pixel data corresponding to the entire photocharges generated in each of the high-sensitivity pixels (HPX) and the low-sensitivity pixels (LPX), thereby generating the HDR image without execution of a separate image composition operation.

When the shared pixel operates in the quad mode, the ISP 300 may apply a gain corresponding to a difference in sensitivity between the low-sensitivity pixel (LPX) and the high-sensitivity pixel (HPX) to pixel data independently generated based on photocharges generated in the low-sensitivity pixel (LPX).

However, when the shared pixel operates in the binning mode, the pixel signal of the shared pixel includes not only components corresponding to photocharges generated by the low-sensitivity pixel (LPX) but also components corresponding to photocharges generated in the high-sensitivity pixel (HPX). As a result, it is impossible for the ISP 300 to apply a gain corresponding to a difference in sensitivity between the low-sensitivity pixel (LPX) and the high-sensitivity pixel (HPX) to be applied to pixel data of the shared pixel without change.

Figure 14:
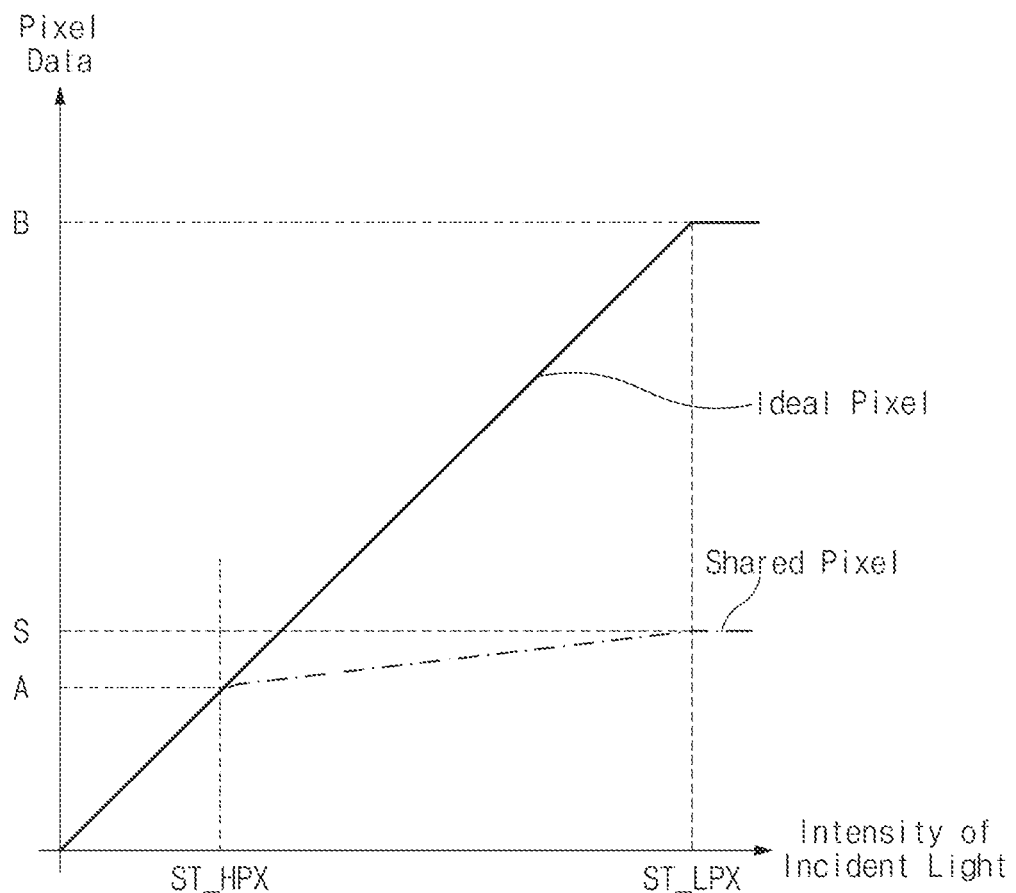
FIG. 14 is a graph illustrating a change in pixel data of a shared pixel according to the intensity of incident light based on some implementations of the disclosed technology.
Figure 15:
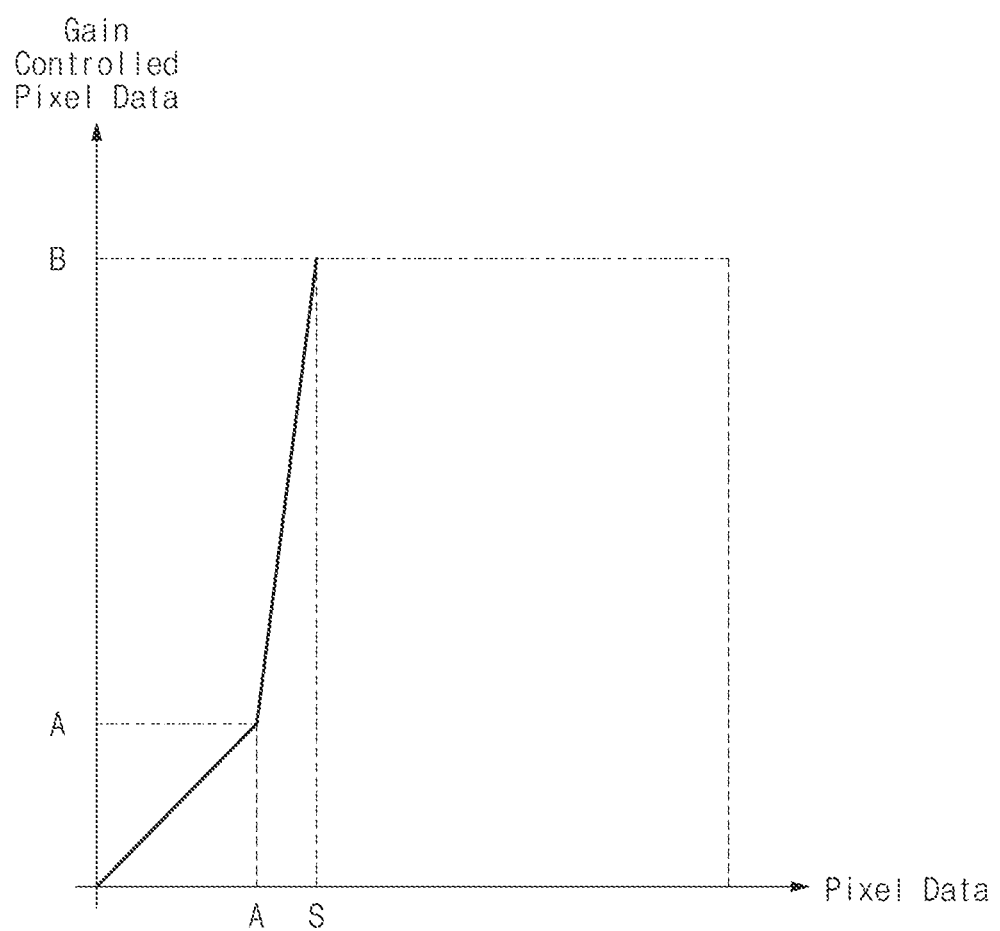
FIG. 15 is a graph illustrating the result of comparison between pixel data of a shared pixel and gain-controlled pixel data based on some implementations of the disclosed technology.

FIG. 14 is a graph illustrating a change in pixel data of a shared pixel according to the intensity of incident light. FIG. 15 is a graph illustrating the result of comparison between pixel data of a shared pixel and gain-controlled pixel data.

The graph shown in FIG. 14 illustrates that pixel data of the shared pixel configured to include three high-sensitivity pixels (HPX) and a single low-sensitivity pixel (LPX) and to operate in the binning mode is changed depending on the intensity of incident light.

Pixel data of the shared pixel may increase with a first slope as the intensity of incident light increases, and may have a first value (A) at a first illuminance (ST_HPX) where the high-sensitivity pixels (HPX) are saturated.

Thereafter, only the low-sensitivity pixel (LPX) can generate photocharges corresponding to the intensity of incident light, and the pixel data of the shared pixel may increase with a second slope smaller than the first slope as the intensity of incident light increases and may have a second value (S) at a second illuminance (ST_LPX) where the low-sensitivity pixel (LPX) is also saturated.

The dynamic range can be extended to the second illuminance (ST_LPX) due to the presence of low-sensitivity pixels (LPX). Compared to the ideal pixel, pixel data of which can increase up to the third value (B) with a first slope until reaching the second illuminance (ST_LPX) according to the increasing intensity of incident light, pixel data of the shared pixel may increase up to the second value (S) with a second slope not the first slope according to the increasing intensity of incident light in a time section from the first illuminance (ST_HPX) to the second illuminance (ST_LPX).

Therefore, in order for pixel data of the shared pixel to represent a graph corresponding to pixel data of the ideal pixel, the ISP 300 for use in a time section between the first illuminance (ST_HPX) and the second illuminance (ST_LPX) may perform calculation (e.g., multiplication) between the pixel data of the shared pixel and a gain to which a difference in sensitivity between the low-sensitivity pixel (LPX) and the high-sensitivity pixel (HPX) is applied.

According to one embodiment, the ISP 300 may apply the gain '1' to pixel data (having the range of 0 to A) of the shared pixel. For pixel data (X) of the shared pixel (where X is higher than A and is less than S), a gain (e.g., 16) caused by a difference in sensitivity between the low-sensitivity pixel (LPX) and the high-sensitivity pixel (HPX) is multiplied by a resultant value obtained by subtracting the second value (S) from the pixel data (X) of the shared pixel, and the sum of the first value (A) and the result of such multiplication is calculated, thereby calculating gain-controlled pixel data. That is, the gain-controlled pixel data of the shared pixel may be denoted by A+G*(X−A) (where G is a gain (e.g., 16) according to a difference in sensitivity between HPX and LPX).

FIG. 15 is a graph illustrating the result of comparison between pixel data of a shared pixel and gain-controlled pixel data based on some implementations of the disclosed technology.

According to the above-mentioned examples, the ISP 300 may apply the gain of 1 to pixel data of the shared pixel having the range of 0 to A (A: First Value), the gain-controlled pixel data for the pixel data of the shared pixel having the range of 0 to A may increase with the slope of 1.

In addition, since the ISP 300 applies the gain of 16 to pixel data of the shared pixel having the range of A to S (where A is the first value and S is the second value), the gain-controlled pixel data may increase with the slope of 16 with respect to the pixel data of the shared pixel having the range of A to S (where A is the first value and S is the second value).

The ISP 300 may generate gain-controlled pixel data using a gain appropriate for pixel data of the shared pixel operating in the binning mode, thereby obtaining a response close to the ideal pixel.

As is apparent from the above description, the imaging device based on some implementations of the disclosed technology is configured such that a high-sensitivity pixel and a low-sensitivity pixel are arranged together, and can thus obtain a high dynamic range (HDR) image by performing image capture only once (i.e., one photographing action).

The embodiments of the disclosed technology may provide a variety of effects capable of being directly or indirectly recognized through the above-mentioned patent document.

Although a number of illustrative embodiments have been described, it should be understood that modifications and enhancements to the disclosed embodiments and other embodiments can be devised based on what is described and/or illustrated in this patent document.

What is claimed is:

1. An imaging device comprising:
an image sensing device including a pixel array of sensing pixels comprising at least one first pixel for sensing incident light and having a first dynamic range represented by a first measurable high light intensity without saturating the at least one first pixel and a first measurable low light intensity relative to a pixel noise level of the at least one first pixel and at least one second pixel for sensing incident light and having a second dynamic range represented by a second measurable high light intensity without saturating the at least one second pixel that is higher than the first measurable high light intensity of the at least one first pixel and a second measurable low light intensity relative to a pixel noise level of the at least one second pixel, wherein the pixel array of sensing pixels is structured to have a ratio of a number of the at least one first pixel to all sensing pixels to be higher than a ratio of a number of at least one second pixel to all sensing pixels; and
an image signal processor configured to receive and process pixel data from the image sensing device to generate a high dynamic range (HDR) image corresponding to a larger dynamic range than the first dynamic range or the second dynamic range, based on pixel data of the at least one first pixel and pixel data of the at least one second pixel in the pixel array,
wherein the at least one first pixel and the at least one second pixel are configured to sense a scene at a same time point.

2. The imaging device according to claim 1, wherein:
each of the at least one second pixel includes a red color filter corresponding to a red color, a blue color filter corresponding to a blue color, and a green color filter corresponding to a green color.

3. The imaging device according to claim 2, wherein:
the at least one second pixel including the green color filter has a lower sensitivity than the at least one second pixel including the red color filter or the at least one second pixel including the blue color filter.

4. The imaging device according to claim 1, wherein each of the at least one second pixel includes:
a photoelectric conversion element configured to generate photocharges corresponding to an intensity of incident light;
a logarithmic transistor having a gate and a drain that are coupled to a power-supply voltage and a source directly coupled to the photoelectric conversion element; and
a drive transistor configured to generate a voltage signal corresponding to a current flowing into the logarithmic transistor.

5. The imaging device according to claim 1, wherein:
the image signal processor is further configured to generate the HDR image by applying a gain corresponding to a difference in sensitivity between the first pixel and the second pixel to the pixel data of the at least one second pixel.

6. The imaging device according to claim 1, wherein:
the at least one first pixel and the at least one second pixel are configured to construct a shared pixel sharing a single floating diffusion region; and
in a binning mode in which the shared pixel generates a pixel signal corresponding to photocharges generated in the at least one first pixel and the at least one second pixel, the image signal processor is further configured to apply a gain corresponding to a difference in sensitivity between the first pixel and the second pixel to a resultant value obtained when pixel data corresponding to illuminance where the at least one first pixel is saturated is subtracted from pixel data of the shared pixel, thereby generating the HDR image.

7. The imaging device according to claim 1, wherein:
the at least one second pixel includes a light blocking structure that blocks at least a portion of incident light; and
the at least one first pixel is configured without including the light blocking structure.

8. The imaging device according to claim 1, wherein:
each of the at least one first pixel and the at least one second pixel includes an optical filter that selectively transmits light corresponding to a transmission wavelength band,
wherein the optical filter included in the at least one second pixel has a lower light transmittance than the optical filter included in the at least one first pixel.

9. An imaging device comprising:
an image sensing device including a pixel array of sensing pixels comprising at least one first pixel for sensing incident light and having a first dynamic range represented by a first measurable high light intensity without saturating the at least one first pixel and a first measurable low light intensity relative to a pixel noise level of the at least one first pixel and at least one second pixel for sensing incident light and having a second dynamic range represented by a second measurable high light intensity without saturating the at least one second pixel that is higher than the first measurable high light intensity of the at least one first pixel and a second measurable low light intensity relative to a pixel noise level of the at least one second pixel, wherein the pixel array of sensing pixels is structured to have a ratio of a number of the at least one first pixel to all sensing pixels to be higher than a ratio of a number of the at least one second pixel to all sensing pixels; and
an image signal processor configured to receive and process pixel data from the image sensing device to generate a high dynamic range (HDR) image corresponding to a larger dynamic range than the first dynamic range or the second dynamic range, based on pixel data of the at least one first pixel and pixel data of the at least one second pixel in the pixel array, wherein:
the image signal processor is further configured to determine, for a frame including the pixel data of the at least one first pixel and the pixel data of the at least one second pixel, a high-brightness region in which a ratio of saturated first pixels per unit pixel group is higher than a predetermined ratio, and a low-brightness region in which a ratio of saturated first pixels per unit pixel group is equal to or less than a predetermined ratio; and
the image signal processor is further configured to generate the HDR image based on the pixel data of the at least one second pixel in the high-brightness region, and to generate the HDR image based on the pixel data of the at least one first pixel in the low-brightness region.

10. The imaging device according to claim 9, wherein:
the image signal processor is further configured to determine, in the low-brightness region, a first transition zone in which the ratio of saturated first pixels per unit pixel group is equal to or higher than a minimum ratio, the first transition zone having directivity in which brightness increases; and
the image signal processor is further configured to generate the HDR image by combining, in the first transition zone, the pixel data of the at least one first pixel and the pixel data of the at least one second pixel using a first composite weight.

11. The imaging device according to claim 9, wherein:
the image signal processor is further configured to determine the low-brightness region adjacent to a boundary between the low-brightness region and the high-brightness region to be a second transition zone; and
the image signal processor is further configured to generate the HDR image by combining, in the second transition zone, the pixel data of the at least one first pixel and the pixel data of the at least one second pixel using a second composite weight.

12. The imaging device according to claim 11, wherein:
the second composite weight decreases in the second transition zone as approaching the boundary between the low-brightness region and the high-brightness region.

13. The imaging device according to claim 11, wherein:
the second transition zone has a predetermined width,
wherein the predetermined width is determined by an average value of pixel data of first pixels adjacent to the high-brightness region.

14. The imaging device according to claim 11, wherein:
the image signal processor is further configured to determine the second transition zone to be in the low-brightness region adjacent to the boundary between the low-brightness region and the high-brightness region, the second transition zone being a specific region in which an average value of the pixel data of the first pixels adjacent to the high-brightness region is higher than a predetermined threshold.

15. An imaging device comprising:
an image sensing device including at least one first pixel and at least one second pixel having a lower sensitivity than the at least one first pixel; and
an image signal processor configured to generate a high dynamic range (HDR) image corresponding to a dynamic range that is greater than a dynamic range of the at least one first pixel or a dynamic range of the at least one second pixel, based on pixel data of the at least one first pixel and pixel data of the at least one second pixel,
wherein
a ratio of the at least one first pixel to all pixels included in the image sensing device is higher than a ratio of the at least one second pixel to all pixels included in the image sensing device.

16. The imaging device according to claim 15, wherein the at least one first pixel includes a photoelectric conversion element to which light with an intensity that increases in response to an increase of an intensity of incident light is transferred, the intensity increasing at a rate higher as compared to that of the at least one second pixel.

17. The imaging device according to claim 15, wherein the image signal processor is further configured to generate the HDR image by adjusting one or more weights given to the pixel data of the at least one first pixel and the pixel data of the at least one second pixel.

18. The imaging device according to claim 17, wherein the image signal processor is further configured to adjust the one or more weights for one or more transition zones that are determined as various portions of a frame based on brightness levels.

19. The imaging device according to claim 15, wherein the at least one second pixel includes a light blocking structure that blocks at least a portion of incident light and is disposed over a substrate.

20. The imaging device according to claim 15, wherein each of the at least one first pixel and the at least one second pixel includes an optical filter that selectively transmits light corresponding to a transmission wavelength band, and wherein the optical filter included in the at least one second pixel has a lower light transmittance than the optical filter included in the at least one first pixel.

* * * * *